March 23, 1954 H. R. VAN DEVENTER ET AL 2,673,241

TELEPHONE ANSWERING AND RECORDING DEVICE

Filed June 2, 1948

7 Sheets-Sheet 1

INVENTORS.
HARRY R. VAN DEVENTER
PAUL C. BAILEY
BY
H. R. Van Deventer
ATTORNEY

INVENTORS.
HARRY R. VAN DEVENTER
PAUL C. BAILEY
BY
H. R. Van Deventer
ATTORNEY

March 23, 1954 H. R. VAN DEVENTER ET AL 2,673,241
TELEPHONE ANSWERING AND RECORDING DEVICE
Filed June 2, 1948 7 Sheets-Sheet 3

INVENTORS.
HARRY R. VAN DEVENTER
PAUL C. BAILEY
BY

ATTORNEY

TELEPHONE ANSWERING AND RECORDING DEVICE

Filed June 2, 1948

7 Sheets-Sheet 4

INVENTORS.
HARRY R. VAN DEVENTER
PAUL C. BAILEY
BY
H. R. Van Deventer
ATTORNEY

INVENTORS.
HARRY R. VAN DEVENTER
PAUL C. BAILEY

BY H. R. Van Deventer

ATTORNEY

TELEPHONE ANSWERING AND RECORDING DEVICE

Filed June 2, 1948

INVENTORS.
HARRY R. VAN DEVENTER
PAUL C. BAILEY
BY H R van Deventer
ATTORNEY

March 23, 1954 H. R. VAN DEVENTER ET AL 2,673,241

TELEPHONE ANSWERING AND RECORDING DEVICE

Filed June 2, 1948

7 Sheets-Sheet 7

INVENTORS.
HARRY R. VAN DEVENTER
PAUL C. BAILEY
BY
H. R. Van Deventer
ATTORNEY

Patented Mar. 23, 1954

2,673,241

UNITED STATES PATENT OFFICE 2,673,241

TELEPHONE ANSWERING AND RECORDING DEVICE

Harry R. Van Deventer, New York, N. Y., and Paul C. Bailey, Warminster, Pa., assignors, by mesne assignments, to Telephone Answering and Recording Corporation, New York, N. Y., a corporation of Delaware Application June 2, 1948, Serial No. 30,538

59 Claims. (Cl. 179—6)

This invention relates to telephone answering devices which may also be used to record messages received over a telephone line circuit and is of the type using records which may be of any desired type.

A record may be made, hereinafter termed a "talkout message" and will be delivered to the calling party via the telephone line. Then, if desired, the calling party may speak and the incoming speech will be recorded on another record, which the user of the device can play back at will.

A recording device to be used in conjunction with a telephone circuit for the purpose of answering said telephone and recording the received message in the absence of persons in its vicinity, should have many features not common to ordinary recording and playback devices. Said features, to be described, relate not only to the mechanical efficiency of the apparatus, but also to the simplifying of its operation and to the safety of the operator, the apparatus and its appurtenances, keeping in mind the fact that the device will be used principally by persons mechanically and electrically unskilled.

It is further desirable that, despite the compact form the device must assume, repairs, when necessary, be readily accomplished without the necessity of removing the instrument from its installed location or completely disassembling the apparatus to replace a part.

With the foregoing in mind, it is an important object of the instant invention to provide a telephone answering device of compact design, simple mechanical construction, and one which is highly economical to both manufacture and operate, and in which the service and maintenance costs are kept at a minimum.

Another object of the invention is to provide equipment which is immediately capable of being used either as a device for the purpose of automatically answering the telephone, recording a message delivered by the calling party, or recording a two-way telephone conversation, and for providing means for playing back such recorded messages into the telephone line or into an electrical reproducer for the benefit of the operator of the device.

A further object is to provide a device adapted to various supplementary functions such as dictation, to which use any recording and playback instrument might be put.

Still another object of the invention is the provision of means for the operator of the device to make a talk-out message of any type and length he desires, whether it be a message to an individual or a general message covering any call that might be received.

A further feature of the invention is the provision of a telephone answering device wherein advantage may be taken of certain of the apparatus embodied in the device to perform additional functions normally considered to be outside the scope of said equipment.

Still another feature of the invention resides in the provision of a telephone answering device of simplified and compact construction, all the mechanical and electrical parts of which are mounted upon a chassis of such design as to make every part accessible to either one or the other side of said chassis.

An additional object is to obtain compactness which is aided by the staggered relationship of the two turntables, the smaller of which is half way under and in front of the larger turntable.

A still further object is to provide means whereby, when disc records are used, a single cutter and a single reproducer may be used on both the large and small records.

A further feature resides in the facility with which the operator of the device may pick off any one message on a record containing a plurality of messages and record said message on a smaller record for filing purposes.

Also an object of this invention is to provide means of automatic switching of the motor and audio circuits through a switch operated mechanically by part of the reproducer mechanism.

Still another object of the invention resides in the provision of a telephone answering device which has only two external circuit connections, one being a plug for the supply voltage and the other being the telephone line.

A still further feature is the provision of means for shorting out the input transformer when, under certain conditions hereinafter described, said transformer is not in use. Such transformers in any amplifier, as is well known in the art, are notorious pickup points of stray A. C. field which cause bothersome hum in the output of the amplifier, particularly when the primary circuit of said transformer is open, as is the case in several instances to be described in the present device.

Other objects and advantages of the invention will be evident from the following description wherein, by way of illustration, preferred forms of the invention are disclosed.

It will be obvious that many changes in details of construction and circuit arrangements can be made without, however, departing from the appended claims.

*General description*

Figure 1:
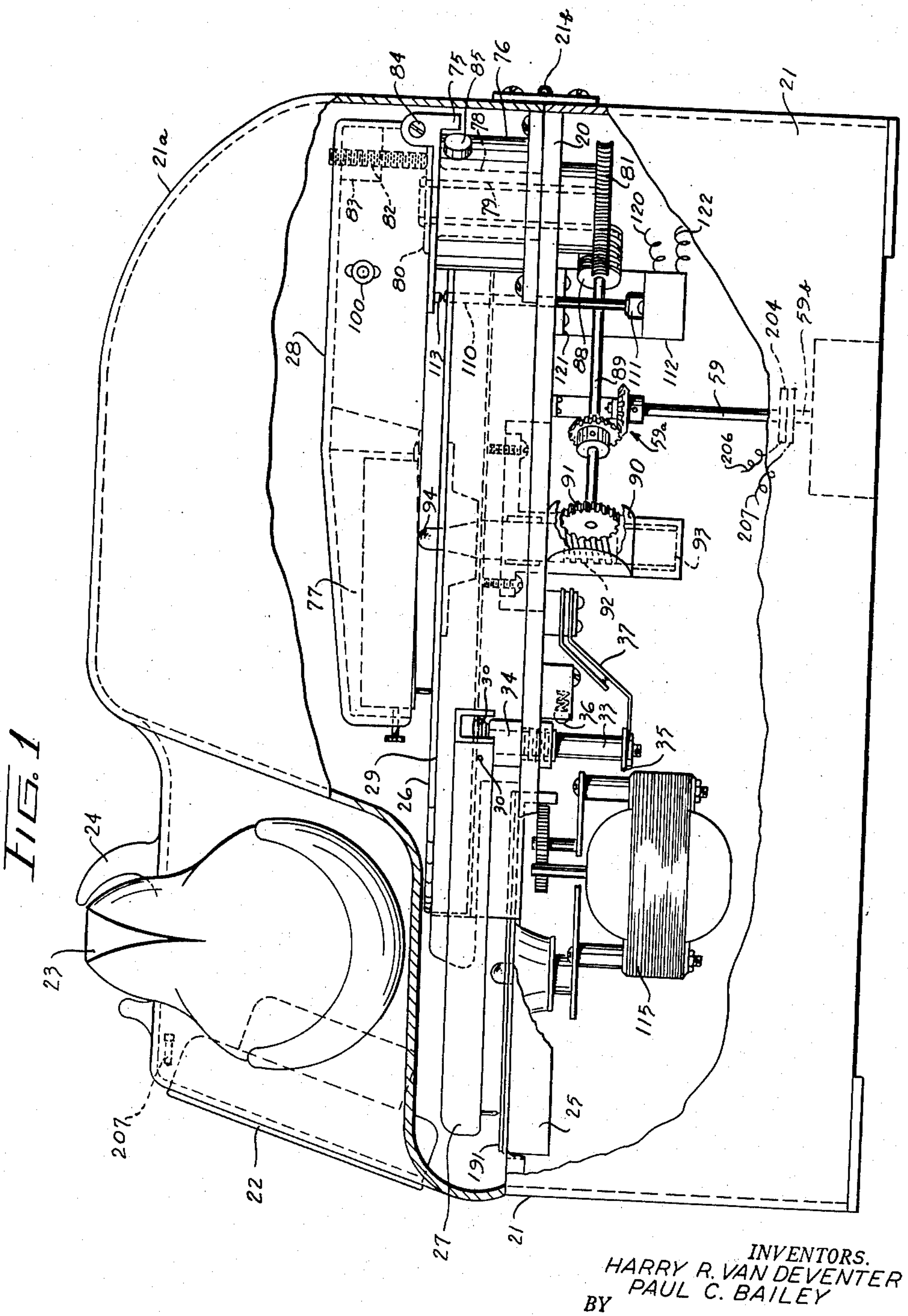
Figure 1 is a side elevation partially in section of an apparatus embodying the invention to show the placement of certain parts and apparatus hereinafter described.

Referring to Figure 1, the numeral 20 denotes a chassis upon which are mounted the principle components of the device. The casing or cabinet of any desired form is designated by the numeral 21. Upon said cabinet is mounted the telephone instrument 23 in a cradle 24 which has two prongs at its rear side which extend up and over the handle of the telephone instrument 23 to prevent the instrument from sliding back when the lid of the cabinet, hinged to the lower part thereof at 21-*b* is raised. This cradle may be so hinged and balanced that it is always in a horizontal position with respect to the chassis. The telephone hook switch 168 is operated when the handset 23 is removed or replaced in the cradle 24.

While the handset is shown as mounted on the lid of the cabinet it will be understood that it can be mounted anywhere thereon. Also, if desired, the handset and its associated parts forming the telephone instrument can be assembled as usual and spaced apart from cabinet 21 and connected for operation therewith by the usual flexible telephone cord or any other suitable conductors.

For the sake of illustration, the recorder and reproducer described herein are of the types employing disc records, but it will be understood that any suitable type of recorder and reproducer may be used, for example, those employing wire or tape on which the sound is recorded and from which it is reproduced; the instant invention having to do with the connection and sequential operation of the reproducer, recorder, and the use of the telephone transmitter and receiver therewith and the connection of the foregoing to the telephone line, it is obvious that the type of record employed is immaterial to the invention.

On the chassis 20 is mounted the small turntable 25. Above, and extending partly over said turntable is the large turntable 26 which is used for both recording and playback. By this arrangement, the length of the device is considerably shortened and the instrument made more compact. Also mounted on chassis 20 are the playback arm 27 and the recording arm 28, the playback arm being made in a curved form so that it may fit around the rim 29 of the large table, which is cut away in its forward portion to permit the turntable 25 to fit below the turntable 26.

The cabinet contains the amplifier and other parts necessary for the operation of the device and as presently described.

*Cyclic control mechanism*

Figure 2:
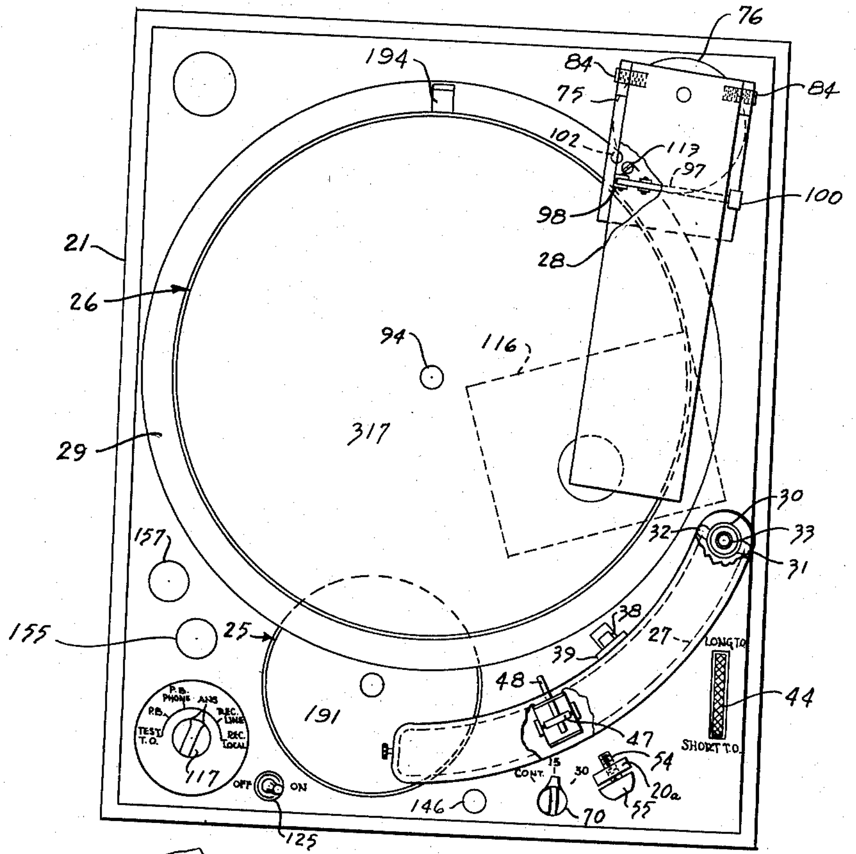
Figure 2 is a plan view of the apparatus of Fig. 1 with cover removed, showing the relative positions of the two turntables, the associated arms, and the various controls.

The playback arm 27 is pivoted on its supporting member 30 as shown in Figures 1 and 2. The member 30 is constructed somewhat in the shape of a yoke and is fitted into adjacent holes 31 and 32 inside the pickup toward its rear extremity. Said yoke 30 is supported by a small tube 33 which slides freely in post 34 so that the pickup may be raised to a higher plane, yet retain its elevated horizontal position as is necessary when playing back records from the large turntable as presently described. Said playback arm is held in its raised position by means of a washer 35 which is secured to the lower end of tube 33, and the ball 36 which is spring pressed in a manner similar to many conventional locking devices.

A switch 37 is opened by washer 35 when the tube 33 is properly located at its lowest position.

Figure 3:
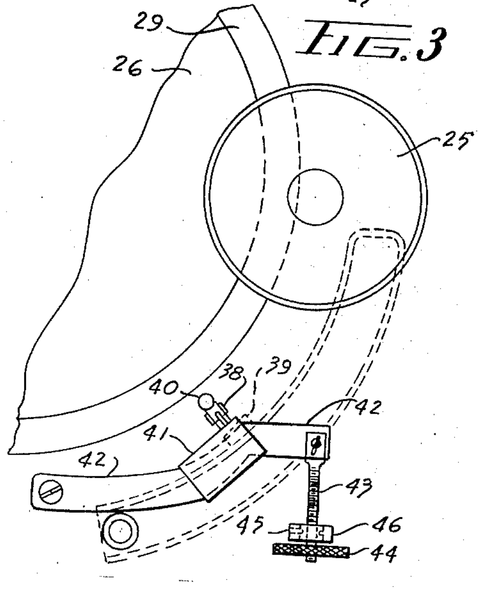
Figure 3 is a bottom view of the switching mechanism which is operated by the pickup arm.
Figure 4:
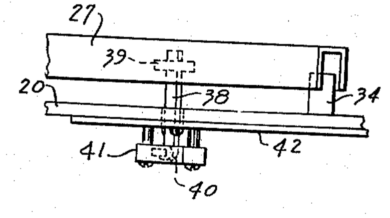
Figure 4 is a side view of the mechanism shown in Figure 3.

Referring to Figures 3 and 4, fulcrumed beneath and extending through the chassis is a lever 38, the upper portion of which rests against a pad 39 on the side of the playback arm in such a manner as to be swung toward the rear of the device by means of the lateral movement of the playback arm in the record grooves. The lower portion of lever 38 is terminated in a ball 40 which actuates a suitable switch 41 which is secured to a lever 42 so that its position relative to the ball 40 is adjustable by means of a screw 43 secured to the extremity of said lever, and a knurled disc 44 which is turned up on said screw but held stationary with respect to its horizontal plane by means of pin 45 in block 46, said block being secured to the chassis.

From the foregoing, it will be evident that the further the switch 41 is moved from ball 40, so much further must the playback arm move in the record grooves toward the center of the record in order to actuate said switch. This permits an adjustment of the mid-cycle shift which, referring to Figure 9, must occur at the end of the talkout message and enables said message to be made of any length up to the capacity of the record without the use of any timing means.

Figure 5:
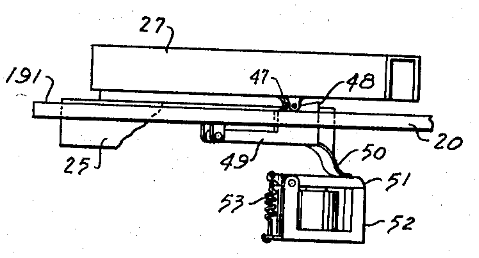
Figure 5 is a side view of the apparatus used to raise and lower the pickup arm.
Figure 6:
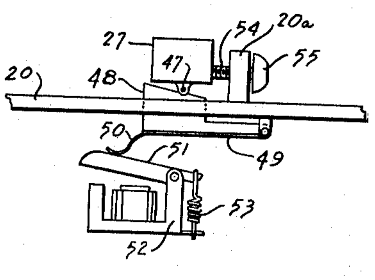
Figure 6 is a front view of the apparatus shown in Figure 5.

As shown in Figures 2, 5 and 6, a roller 47 is secured beneath the playback arm 27 at a point about half way between the two ends thereof. Said roller rides on the upper edge of blade 48 of lever 49. Lever 49 is hinged at its forward end and has a downwardly extending rigid finger 50 at the opposite end which is positioned so as to engage the armature 51 of relay 52. Blade 48 of lever 49 is so constructed that its gradient, with relay 52 de-energized, will be of sufficient angle to permit the playback arm, by means of its own weight, to ride down its slope on roller 47. The height of blade 48 is so adjusted that at its lowest point the needle of the playback element is clear of the record 191 on table 25. Blade 48 is held in an upward position due to the tension of spring 53, as shown in Figure 6.

From the foregoing, it will be seen that, when relay 52 is energized as shown in Figure 5, the angle of blade 48 will assume a nearly horizontal position beneath the plane of the roller 47, permitting the needle of the playback element to be lowered to the record 191 and traverse the recording thereon in a normal manner.

A further reference to Figure 6 will show that the playback arm, after rolling down blade 48, comes to rest against screw 54 which is supported in upright 20–*a*, which is secured to the chassis 20. Screw 54 is turned by knob 55 thus providing an adjustment of the starting point where the playback arm is lowered to the record.

*Timing mechanism*

Figure 9:
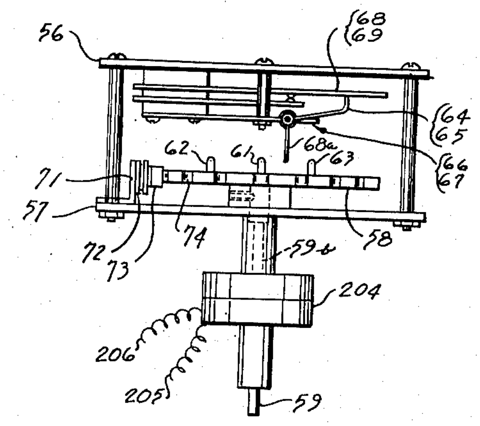
Figure 9 is a side view of the timer mechanism which controls the length of recording time.

Figure 9 illustrates a suitable talkout timing mechanism. This consists of two plates 56 and 57 spaced by bushings in their four corners and supported on the chassis at any suitable point. On the bottom plate 57, is revolvably supported a disc 58 which is connected by a shaft 59–*b* (or in any suitable manner) to the driven side of a magnetic clutch 204, the driving side of which is connected to a flexible shaft 59 driven by the gearing 59–*a* from shaft 89 driven by motor 116.

It will be observed that shaft 89 rotates whenever a record is being made on the large turntable.

Figure 15:
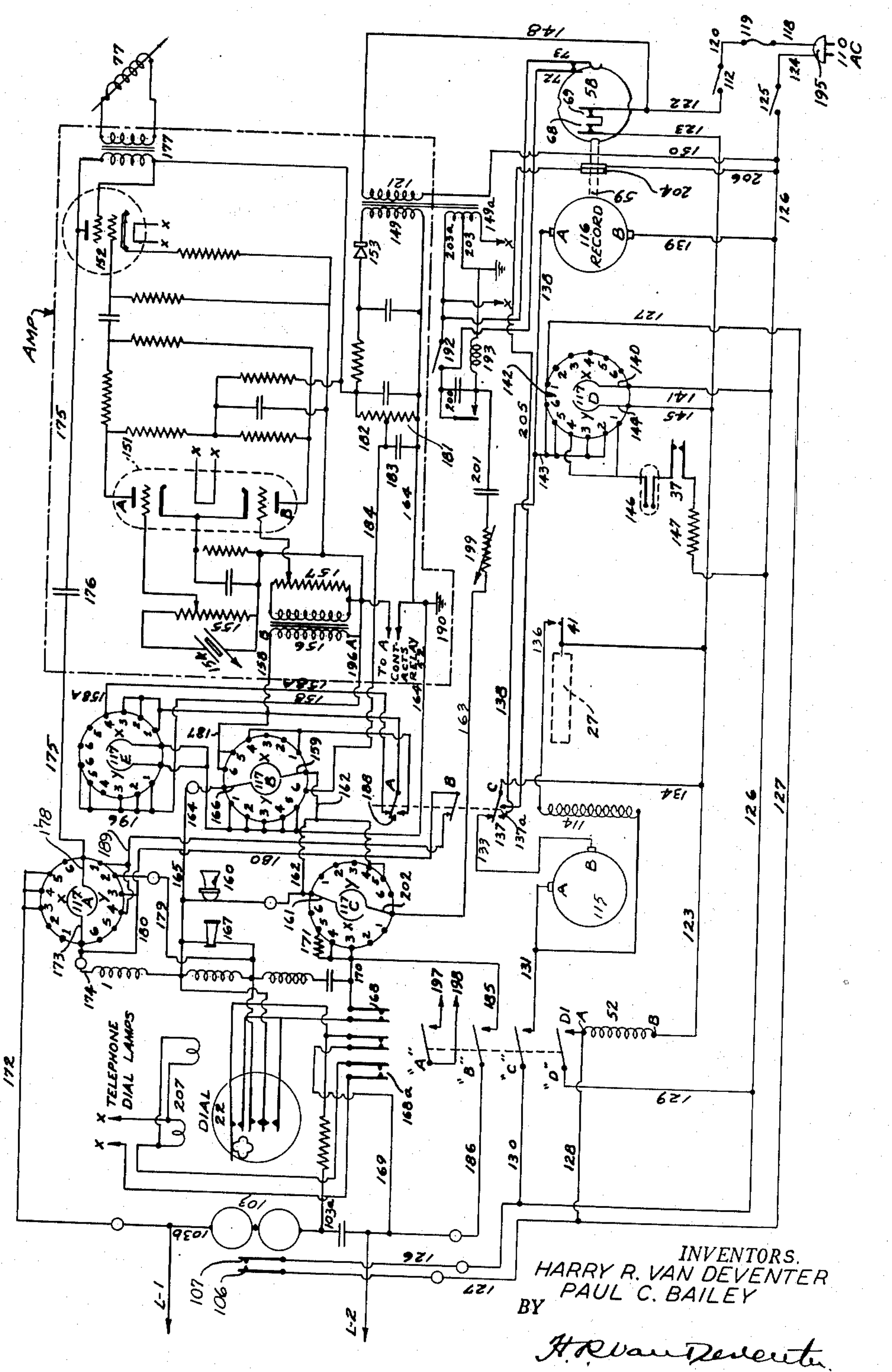
Figure 15 is a schematic diagram of the wiring and control circuits.

As best seen in Figure 15, clutch 204 is only actuated to drive the timer disc 58 via shaft 59 and motor 116 when relay 114 is actuated, closing its contact 137A so that the timer is only effective to control the device when in the "Automatic" position of switch 117. At other times, for instance when said switch is in "Record Two Way" position, the large turntable will rotate continuously without the timer being effective.

Timer disc 58 has two pins 60 and 61 evenly spaced circumferentially near its outer edge, midway between the rim of disc 58 and its hub are two additional pins 62 and 63, a line through which would be at right angles to a similar line through pins 60 and 61. Above the pins are mounted two small angular levers 64 and 65 so situated that each lever is actuated by one set of pins. Levers 64 and 65 are held in position and given tension by means of springs 66 and 67. Over each of the levers and at right angles to the axis of said levers are two pairs of contacts 68 and 69, said two pairs of contacts being wired together in a series connection as shown in Figures 11 and 15.

Figure 11:
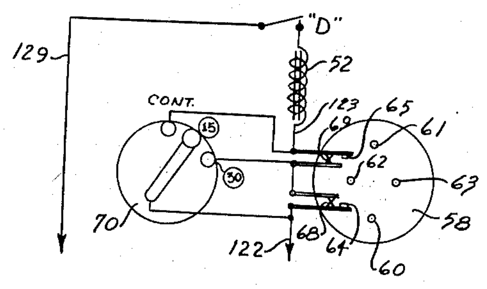
Figure 11 is a diagram of the electrical circuits of the timer shown in Figures 9 and 10.

From the foregoing, it will be observed that when the disc 58 revolves clockwise as in Figure 11, the pins 60, 63, 61, 62 will successively and alternately engage the lower legs 68–*a* of levers 64 and 65, thereby cocking these levers against the tension of springs 66 and 67. As the levers are released from the pins, they spring back to normal position, the upper end of each lever striking its associated spring 68 or 69 a sharp blow and opening the contacts associated therewith, which immediately close as the levers are returned to normal.

The circuit, via conductor 129, relay 52 and conductors 122, 123 is opened by the aforesaid operation to control the operation of the device as hereinafter described.

By means of switch 70 one set of the contacts 68, 69 may be short circuited whereupon pins 60, 61 or 62, 63 will, if disc 58 revolves once per minute, give a closed circuit interval of thirty seconds.

By opening switch 70 as shown in Figure 11, both sets of contacts 68, 69 will be in series, giving a closed circuit interval of fifteen seconds.

By other arrangements of pins and controls, other timing intervals can be obtained, the timer being automatically re-set between operations. By short circuiting both sets of contacts 68, 69 the timer becomes inoperative and motor 116 can be operated continuously, dependent upon the manual adjustment of switch 117.

By a simple re-arrangement of the circuits which will be obvious, when switch 70 is set for "continuous operation," magnetic clutch 204 may be dispensed with and the flexible drive shaft 59 connected directly to the disc 58 of the timer.

Figure 10:
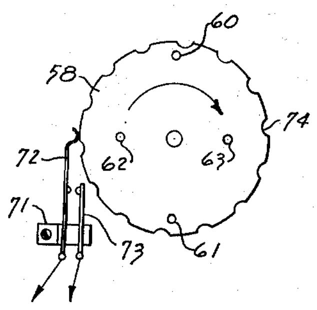
Figure 10 is a top view of the timer disc 58 showing means for operating the line recording signal switch.

Referring to Figure 10, a bracket 71 mounted on the timer unit carries a pair of normally open contacts 72 and 73, the longer blade 72 of which rests against and is held open by the periphery of the disc 58. Around the circumference of said disc are notches 74 of such depth that when, due to the movement of disc 58, blade 72 falls into such a notch, contacts 72 and 73 close to complete a circuit. This switching circuit is employed to comply with recent Federal Communications Commission requirements providing that telephone recorders must incorporate a warning signal when such recording is being used. By this invention such a signal mechanism is incorporated in and forms part of the complete device instead of being mounted and operated separately therefrom as heretofore.

In Figure 15 it will be seen that contacts 72 and 73 control the operation of a high frequency buzzer 193 which obtains its operating current from one-half of the filament winding of transformer 149 through conductors 203 and 203*a*.

A condenser 200 is shunted across the contacts of said buzzer to form an oscillatory circuit. Switch 192 is serially inserted in the current supply lead 203A, said switch being used to manually operate the buzzer as a signal at the finish of the talkout recording as hereinafter described.

Switch 192 is shunted by contacts 72 and 73 previously described as being cam operated by the rotation of the timer disc 58.

Signal current is picked off the buzzer at its stationary contact and fed through a condenser 201 and a resistor 199 to the movable contact 202 of switch 117–*c*, section Y, by means of conductor 163. From contacts 4 and 5 of this same switch, the signal is led to movable contact 161 on the X side of said switch to the hook switch 168 by conductor 170. From the hook switch, the signal is impressed on the L–2 side of the telephone line circuit by means of conductor 169.

*Recording mechanism*

In Figure 1 is shown the details of the mechanism used to drive the cutter arm 28 across the record so as to cut its grooves at any desired rate—for example—120 lines per inch. It will be understood that any methods of driving the recording mechanism may be employed.

The recording or cutting arm 28 is swung on a transversely pivoting shoe 75 in a hollow swivel post 76 and carries in its forward end a cutting head 77 mounted in such a manner as to permit limited vertical movement, a mounting well known in the art and requiring no further description.

Pivot shoe 75 is secured to the upper end of a slip-fitting bushing 78 which moves freely with a transverse motion in post 76. Fitted inside bushing 78 is a hollow tube 79 at the upper extremity of which is secured a disc 80; tube 79 is driven at its lower extremity by worm gear 81.

A screw 82 is set vertically into a block 83 secured to arm 28 somewhat to the rear of the center line of disc 80 so that in lowering the arm on its vertical pivot 84, the end of screw 82 will engage the outer edge of disc 80.

Figure 8:
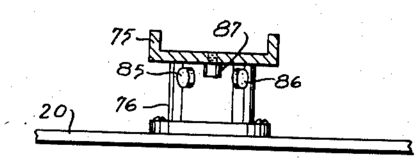
Figure 8 is a detail view of the means used to limit the transverse motion of the cutter arm.

Referring to Figure 8, the shoe 75 overhangs its bearing as shown, and has a downwardly projecting pin 87 located between two stop pins 85 and 86 projecting rearwardly from the post 76. The radial movement of the arm 28 carried by the shoe is thus limited.

Gear 81 is engaged by worm 88, said worm being secured to shaft 89 which extends outwardly to a gear box 90 and is secured to gear 91 therein. Gear 91 is driven by worm 92 mounted on and secured to a shaft 93 which is journalled at both ends of the gear box 90 and which also comprises the center post 94 of the turntable 26 which is driven in any suitable manner by motor 116 which is not shown in Figure 1 but which is located within the cabinet 21 in the usual manner.

Figure 7:
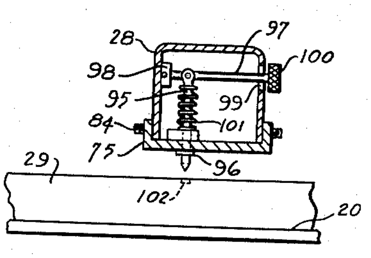
Figure 7 is a sectional view through the rear of the cutter arm showing the mechanism that determines the starting point in cutting a talkout record.

In Figure 7 is shown the method by which the starting point of the talkout record, in relation to the center of said record, is determined. A rod 95 which has its lower extremity pointed, is fitted through a hole in the pivot shoe 75. Said rod has a small flange 96 which is so situated under the shoe as to allow the rod to be urged upward no higher than is necessary for the point of said rod to clear the top of rim 29. Rod 95 is hinged at its upper end to another rod 97 in a lateral position across the inside of the cutter arm 28. Rod 97 is hinged to the inside of arm 28 and passes through an opening 99 so that it is allowed a limited vertical movement. Said rod 97 projects outwardly and has a small knob 100 fitted over its outer end. Rod 95 is held in an upward position by means of spring 101. A hole 102 is drilled into the rim 29 at a particular point so that when knob 100 is pushed downward and the cutter arm is moved to the proper position, the point of rod 95 will slip into the hole 102, in this way standardizing the positioning of the talkout record's starting point.

*Ringer signalling switch*

Figure 12:
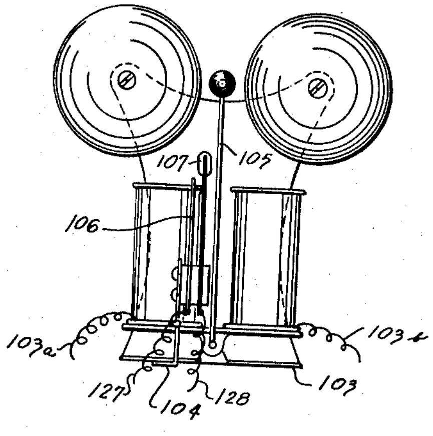
Figure 12 is a diagram of the ringer starting switch.
Figure 13:
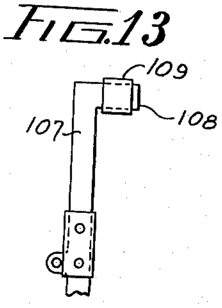
Figure 13 is a detail view of the switch in Figure 12.
Figure 14:
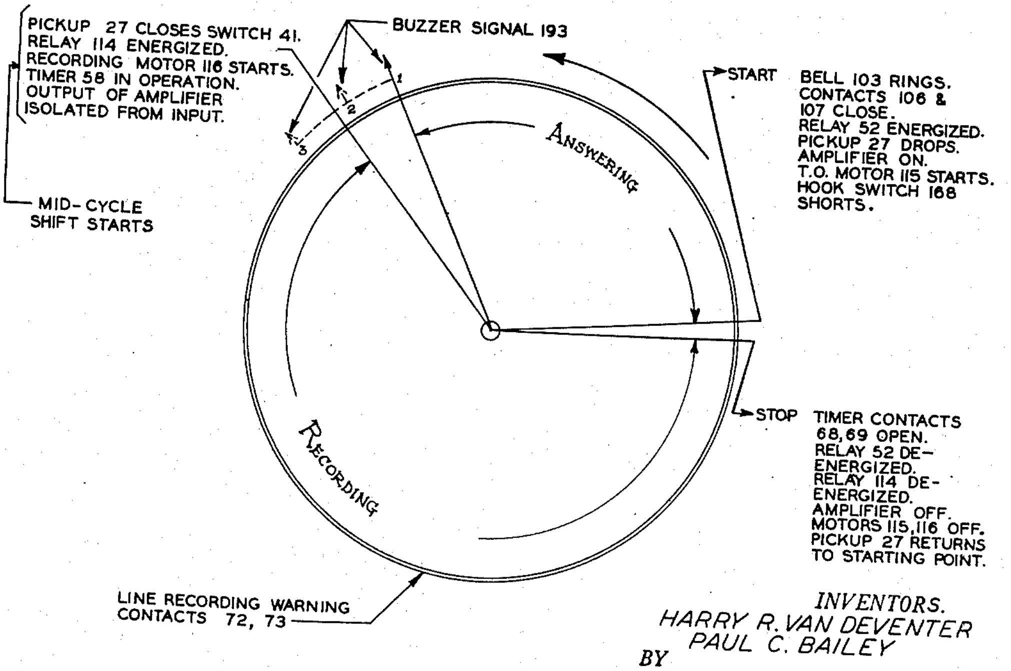
Figure 14 is a polar diagram of the answering and recording cycle.

In Figures 12–13 it is shown that to a standard telephone ringer 103 is fitted a bracket 104 in such a position as to be located in front and to one side of the clapper rod 105. To said bracket is secured a pair of contacts 106, 107, the longer of which has a projection 108 at right angles to the body of the contact spring 107, said projection being covered by a slip of insulation 109, such as ordinary spaghetti tubing. It will be noted that any movement of the clapper rod toward projection 108 will result in a closing of the two contacts thus completing a circuit. The connections of the ringer and the operation of the contacts will be described in connection with Figure 15. It is obvious that the contacts could be operated by a suitable relay instead of by ringer 103.

*Limit switch*

A reference to Figure 1 will disclose the operation of the limit switch 112 to prevent the operation of the recorder when a record blank is filled.

A rod 110 extending through a hole in rim 29 and chassis 20 is held in an upward position by the button 111 of the microswitch 112. A conical pin 113 engages the rounded top of rod 110, said pin being threaded, for the purpose of adjustment, into the under side of shoe 75. Pin 113 engages rod 110 by reason of the lateral movement of the arm 28 across the record, and in urging said rod downward operates the switch 112. The operation of said switch will be described in connection with Figure 15.

*Figure 15—Motor control circuits*

It will be noted from the following that there are a plurality of circuits to sequentially operate the two relays 52 and 114 and each motor 115 and 116 in their respective employments on different positions of the selector switch 117. The selector switch, it will be noted from Figure 15, is a common wafer type switch comprising four wafers designated in Figure 15 as 117 A, B, C, D, respectively, each wafer consisting of two separate circuits of six positions each. The two circuits on each wafer are distinguished in Figure 15 as X and Y.

Referring to Figure 15, it will be seen that from A. C. current supply plug 195 a conductor 118 is connected to a fuse 119 from which leads a conductor 120 to limit switch 112, said switch being normally closed. From said limit switch, a conductor 122 is connected to the timer contacts 68, 69 previously described, from which the circuit continues via conductor 123 to point B on the winding of relay 52.

A conductor 124 connects the line voltage A. C. plug to the on-off switch 125. From the other side of said switch a conductor 126 runs to contact 106 of the ringer and from its mating contact 107, a conductor 127 connects to the number 1 contact of the X side of section D of switch 117. Terminal A of relay 52 is connected to conductor 127 via conductor 128. Hence it will be seen that with switches 112 and 125 and contacts 68, 69 all closed, the closing of the ringer starting contacts 106 and 107 will energize relay 52 when the device is supplied with current via plug 195. However, as the operation of contacts 106, 107 is momentary, means must be provided to hold relay 52 closed until the end of the automatic cycle to be presently described. Such means include contact D of relay 52 which contact closes down on contact D1 of said relay, said contact D1 being connected via conductor 129 to conductor 126, this having the effect of shorting contacts 106 and 107 thus holding the relay in an energized condition.

It will be noted that with relay 52 energized, its contacts C are closed thereby supplying, through conductors 130 and 131, one side of the A. C. current supply conductor 126 to terminal A of motor 115 and terminal A of the winding of relay 114. Terminal B of motor 115 is connected via conductor 132 to one of the normally closed contacts 133 of relay 114. Contact C of said relay is a single pole double throw contact, which is connected to current supply conductor by means of conductor 134. Thus it will be evident that when relay 52 is energized, motor 115 will operate.

Switch 41 of Figure 3 is shown as connected via conductor 135 to conductor 123 so that when the playback arm 27, as previously described, reaches the preadjusted point of closure, a junction is made between trunk 123 and point B of relay 114 via conductors 135 and 136.

With relay 114 energized, its contact C will open from contact 133 thereby opening the circuit to the talkout motor 115 and close another circuit at contact 137 via conductor 138 thereby leading from conductor 123 through conductor 134, contact 137, and conductor 138 to terminal A of motor 116. Terminal B of said motor is joined by conductor 139 to trunk 126 so that motor 116 will now be in operation.

The D section of switch 117 is incorporated in the device so that the motors may be controlled manually. It will be noted that a movable contact 140 on the X side of switch 117D is led to the conductor 126 by means of conductor 141. Contact No. 1 of that same side on wafer 142 is connected via conductor 127 to conductor 128 so that it will be evident that turning the selector switch 117 to this position will have the effect of short circuiting the ringer contacts 106 and 107, thus energizing relay 52 which in turn, through its contacts C supplies current from conductor 126 to the talkout motor 115.

Motor 116 is used on four positions of the selector switch 117. This switching may be accomplished manually by reason of terminal B of motor 116 being connected via conductor 139 to conductor 126 while the A side thereof may be switched to various positions.

Terminal A of motor 116 is led to the Y side of section D of switch 117 through conductors 138 and 143 and the movable contact 144 of said switch is connected to conductor 123 via conductor 145. It will be noted that positions 1 and 4 this same side of said switch are connected to a small neon light, glow tube or other lamp or signal device 146 which is in series with switch 37, to which is connected a resistor 147 which is connected to trunk 126. Said resistor is of such value as to bring the applied voltage within the range of the neon light or other glow tube device. This light is used to indicate when the playback arm 27 is properly down in its lower position as shown in Figure 1. If the arm is moved out of its operating position relative to the small record, the lamp will be illuminated, warning the user to restore the arm to the lower position.

*Figure 15.—Amplifier and talking circuits*

A conductor 148 is led from conductor 122 to one side of the primary 121 of transformer 149. Another conductor 150 connects the main conductor 126 to the other side of said transformer, which is used to supply plate and filament voltage to the amplifier.

Any suitable amplifier and power supply may be used; the one illustrated employs a dual triode tube 151A and B as a mixer input tube. A beam power tube 152 is used as the output tube. Rectification of the secondary voltage of transformer 149 is accomplished by means of a small selenium rectifier 153. As the internal functions and circuits of such devices are well known in the art, only the external connections will be described.

The crystal element 154 of the playback arm 27 uses section A of the dual triode input tube 151, the output of said element being controlled by a potentiometer or volume control resistor 155. Section B of tube 151 provides passage for the telephone talking current into the amplifier. It should be noted that the telephone circuits are isolated from the grid of tube 151, by a transformer 156 and that the output level is adjustable by means of volume control resistor 157.

The main input conductor 158 of the amplifier at the B side of the input transformer 156 is connected to positions 5 and 6 on the X side of section B of switch 117 and also to positions 1, 2 and 3 on the X side of switch 117E. It will be noted that the movable contacts of said last switch on both sides of same are grounded to conductor 164, thereby shorting out the primary of transformer 156 on these positions and consequently reducing the possibility of hum pickup in said transformer.

The same result is accomplished during the talkout phase of the Automatic cycle on position No. 4 of switch 117 by conductor 158-A which is connected to the normally closed side of contact A of relay 114. When said relay is energized at the end of the talkout message, this contact is broken and the input transformer 156 is in condition to receive talking current from the telephone circuit.

The movable contact 159 of the X side of switch 117B is led to the telephone transmitter 160 and to the movable contact 161 of the X side of switch 117C via conductor 162. Also connected to conductor 162 through the Y side of switch 117C is the conductor 163 from the buzzer circuit hereinafter described.

A terminal of the input transformer 156 is connected to the neutral or ground side of the amplifier current supply through contact A of relay 52.

It should be explained that the term "ground" as used in this application and in connection with most electronic devices means a common or neutral point with respect to the instrument itself and in no way refers to any external connection such as earth, water pipe, etc.

Ground conductor 164 is brought to the Y side of switch 117B at positions 1, 2, 3, 4, and 5. The movable contact 166 of said switch is led to the junction point of the telephone receiver 167 and transmitter 160 via conductor 165, thus forming a common or "ground" circuit between the telephone instrument and the amplifier.

It will be noted that the telephone line L-1, L-2 is to be connected to the internal working parts of the device at only three positions of switch 117, Nos. 3, 4 and 5 positions respectively, although at all times the ringer 103 is in circuit on said line. Accordingly, it will be observed that L-2 of the telephone line is led to the hook switch 168 by conductor 169 and that conductor 170 continues from hook switch 168 to positions 3 and 4 in the Y side of switch 117D.

Position No. 5 of this same switch is connected to conductor 170 through a serially included resistor 171, said resistor being inserted in series with the local telephone transmitter on "Record Two Way" position of switch 117 to decrease the current applied to said transmitter thereby lowering its output to the same level as that of the incoming signal.

The insertion of resistor 171 into the telephone circuit is effected by means of movable contact 161 of the X side of switch 117C and contact No. 5 of the same switch.

Looking at the X side of switch 117A, it will be seen that L-1 of the telephone line proceeds to positions 3, 4 and 5 of said section A through conductor 172, while movable contact 173 is led to terminal 1 of the telephone induction coil by conductor 174 so that this side of the line is also broken in some of the positions of switch 117 as shown. The principal output lead of the amplifier is shown as conductor 175 which connects through condenser 176 to the plate of the output tube 152. The cutter or recording element 77 is connected at all times to the amplifier through transformer 177.

Output conductor 175 is shown as connected to movable contact 178 on the Y side of switch 117A where it makes contact at 1, 2, 3 and 4 positions. At number 2 or playback position, a direct circuit is formed from the output of the amplifier to one side of the telephone receiver 167 through conductor 179, the other side of said receiver being a direct return to "ground" as previously described. On No. 3 on the Y side of switch 117A and conductor 180 which is connected to movable contact 173, the output of the amplifier is fed directly into the telephone line circuit via contact 173 on position 3 on the X side of said switch.

*Figure 15.—Using the telephone transmitter as a microphone for recording*

In order to use the telephone transmitter 160 as a microphone for the purpose of making a recording, a local source of current must be employed. Said current may be obtained through the voltage drop across resistor 181 which is in series with resistor 182 in the familiar "bleeder" arrangement across the current supply of the amplifier. Additional filtering is supplied by means of a high capacity condenser 183.

It will be seen that conductor 184 is led from the junction of resistors 181 and 182 to the No. 6 position on the Y side of switch 117B. This is "Record Local" position, the only position at which such local current supply is used when the device is employed in a "common battery" telephone system. It will be found that the wiring comprises a simple series circuit such as is used with any carbon microphone. From the movable contact 166 of switch 117B, conductor 165 leads to the transmitter 160, the other side of said transmitter being led to movable contact 159 of switch 117B and from the No. 6 contact of said switch to terminal B of the input transformer 156. Terminal A of said transformer returns to the "ground" side of the voltage supply by means of conductor 196, through the Y side of switch 117E. Thus it will readily be perceived that when a local recording is desired, the selector switch 117, on being turned to No. 6 position, will disconnect the telephone line L-1 and output conductor 175, and put the microphone in series with its exciting voltage and input transformer.

Switch 117 being in position No. 5, the operation is exactly the same as described in connection with "Record Local" except that the local source of current for supplying the transmitter 160 is not used, said transmitter receiving its current via L-1, L-2.

It will be observed that with the switch 117 in this position, the recorder input 158 is connected across the telephone line L-1, L-2, so that the recorder 77 will record on recording disc 317, speech going in both directions in said telephone line circuit and that motor 116 is in operation as perviously described.

*Figure 15.—Playback*

To play either of the records, large or small, switch 117 is turned to position No. 2 which connects the output of the amplifier to the telephone receiver 167. The playback arm 27 is now lowered to the record and, as the circuit to motor 116 has been completed via switch 117D, the record is moved relative to the playback arm 27 and the recorded speech is reproduced, amplified, and heard in the receiver 167.

*Figure 15.—Playback over line*

Switch 117 is turned to position No. 3 and the operation is exactly the same as described in the preceding paragraph, except that the telephone line is connected to the telephone instrument and therefore receives the outgoing speech.

*Figure 15.—Automatic operation, answering the incoming telephone call and recording an incoming message*

It will be evident to one skilled in the art, if the output of the amplifier is fed into the telephone circuit for the purpose of delivering a message over the telephone line or to play back a message into the telephone receiver, said telephone circuit must be isolated from the B side of tube 151 to which it would normally be connected through transformer 156. This isolation must occur at any and all times that the aforementioned conditions exist, otherwise undesirable feedback of the output of said amplifier to the input of same will result.

Conversely, when the input circuit is being used for recording either "local" or "line," the output conductor 175 must be disconnected from the telephone circuit. This isolation will be shown as taking place in the following paragraphs.

When the telephone bell 103 rings, closing contacts 106 and 107 thus operating relay 52 as previously described, contacts B of said relay, through conductors 185 and 186, effectively short circuit the telephone hook switch 168, closing the L-2 side of the telephone line into the Y side of switch 117C through contact No. 4 and movable contact 161 of the X side of this same switch. From said movable contact, a conductor 162 is led to movable contact 159 on the X side of switch 117B. With movable contact 159 at position No. 4, a conductor 187 is led from said position No. 4 to the A contact on relay 114, which contact is, at this phase of the cycle, open, so that the telephone input, section B tube 151, of the amplifier is isolated from the telephone circuit at point 188 of said contacts A of relay 114.

It will be recalled that the talkout motor 115 has been running for reasons previously described, and driving the playback arm across the record 191 so that the talkout is being played into the amplifier, the output of which, at this time, is being fed through condenser 176, conductor 175, movable contact 178 of the Y side of switch 117A, into contact No. 4 of said section. From said contact No. 4 a conductor 189 is led to the normally closed B contact of relay 114 and from the blade of said contact B through conductor 180 to the movable contact 173 on the X side of switch 117A. Said movable contact being on No. 4 position, the output of the amplifier is thus led into the L-1 side of the telephone line via conductor 172. The L–2 side of the telephone line, as shown previously has been connected to the "ground" side of the amplifier circuit.

An examination of the previous paragraph will disclose that, while the B input of tube 151 is isolated from the telephone circuit through contacts A on relay 114, the playback element 154 is playing through its own input A of tube 151 into the amplifier and thence into the telephone line L–1 via output conductor 175 as previously described, L–2 being "grounded" at 190, thus providing a direct return for the audio circuit.

Assuming that the talkout message has been finished and switch 41 operated by the arm 27 reaching the end of the message as previously described, thereby energizing relay 114; motor 116 has started and contacts B of relay 114 have opened, which action effectively isolates the output of the amplifier from the input B tube 151 as previously described. Contacts A of said relay have closed, completing the circuit from the telephone line L–1 to the input transformer 156 so that any incoming speech on the telephone line is impressed on the grid of the amplifier tube 151, section B, amplified, and expressed into the recording element 77, and cut in the disc 317, the main output conductor 175 being disconnected through contacts B of relay 114.

The shaft 59 of the timer, Figures 9, 10, 11, is coupled to motor 116 by means of an electro-magnetic clutch 204, one conductor 206 of said clutch being connected to trunk 126. Another conductor 205 from said clutch is connected to a contact 137–A on relay 114 so that the timer is operative only when said relay has been energized.

The timer has been set, for example, for a thirty second interval, at the end of which time its contacts 68, 69 open momentarily, opening the circuit through starting relay 52, as previously described. Said relay, in de-energizing, returns the playback arm 27 to its starting position as previously described and also de-energizes relay 114 via contact C of relay 52. Also, in de-energizing, relay 52 opens its contacts A. When said contacts open, the circuit from "ground" 190, previously opened on this circuit through the Y side of switch 117E, is broken via conductors 197 and 198, thereby opening the plate voltage supply to the amplifier. This action permits the filaments of the amplifier tubes to continue hot but discontinues the plate current drain. Relay 114, in de-energizing, opens its contacts C, thereby de-energizing both the motor 116 and the magnetic clutch 204.

*Fig. 15.—To record the talkout or answering speech*

A small disc 191, Figure 1, is placed upon the recording turntable 26 and the recording arm 77 is grasped in the left hand and raised slightly so that it is clear of the record and turntable. The small knob 100, at the rear of said arm, is pressed down lightly and the arm is swung slowly to the left until said knob drops down by reason of the point of rod 95 entering hole 102 in rim 29. It will be found that the recorder arm, for reasons previously explained in connection with Figure 7, will be locked in place as long as the knob 100 is held down at this point. The arm is then lowered to the record at a point which will be found to be about $\frac{3}{16}$ of an inch from the edge of said record, then knob 100 is released. In this manner, the starting point in recording the talkout message is standardized, permitting the least possible adjustment of knob 55, Figure 6, which controls the point at which the playback arm is lowered to the record, and which will hereinafter be described.

The knob of the selector switch 117 is then turned to "Record Local" position, at which time the recording turntable moves. The telephone handset is grasped in the left hand and, after a few grooves have been cut, the talkout message is spoken into the transmitter 160. At the end of the talkout message, the buzzer switch 192, Figure 15, is pressed three times in successions of approximately one second each. This action impresses the signal of the high frequency buzzer 193 on the talkout record, designating the end of the talkout message and serving as a signal to the caller to begin speaking when the record is played over the telephone line in answering incoming calls. The selector switch is then turned to the automatic position, stopping the recording turntable and the recording arm is raised and swiveled to the rear of the instrument and there put down on its rest 194, Figure 2.

*Fig. 15.—Testing the talkout record*

It will be obvious that, with talkout messages of various lengths, some provisions must be made to vary the mid-cycle shift of circuits, which shift is controlled by the movement of the playback arm in the record grooves, as explained in the description of Figure 3.

In testing the talkout record, all audio circuits are identical with those on the "Automatic" position of the selector switch, with the single exception that, through No. 1 contact on the X side of switch 117A, the telephone line L–1 is opened thereby obviating any disturbance on said line. In the motor control circuits, as before described, No. 1 contact on the X side of switch 117D short circuits the ringer contacts 106, 107 to energize the starting relay 52.

The record containing the talkout message is placed on the small turntable and the playback arm 27 is down in its normal resting position against screw 54, it being made certain that the indicating light 146, toward the front of the chassis, is not lit, indicating that the arm 27 is in its correct position.

Selector switch 117 is turned to "Test" position which action energizes relay 52, lowers the playback arm to the record, and starts motor 115 which moves the small turntable. If the needle of the playback arm falls on the record outside of the first groove, knob 55 is turned clockwise until the needle falls into said first groove. If the needle falls into the body of the message knob 55 is turned counter-clockwise until, by holding the arm against screw 54, the needle is in its proper position. The talkout message is then played through and may be heard in the telephone receiver 167.

While said message is playing through, a knurled disc 44 at the right of the chassis as shown in Figure 2, is moved slowly toward the operator and in the direction indicated by the inscription "Short Talkout," until the turntable stops. Disc 44 is then moved slowly in the opposite direction indicated by the inscription "Long Talkout" which action again permits the turntable to revolve. This action is continued until the second buzzer signal is heard. The record is then played again so that any minute adjustments of the starting and ending positions may be made. The record and arm are then left in adjusted position for automatic operation.

*Fig. 15.—Re-recording*

At certain times it might become necessary to file a given message for record purposes. In the instant invention it is not necessary to file the complete large disc with its various non-important messages and attendant bulkiness. A message may be picked off, so to speak, of the large record and impressed on one of the smaller records. This is very easily accomplished as follows: The large record containing the desired message is placed on the large turntable 26 and a small blank record laid directly over top of said large record. The recording arm is then adjusted on the small record as previously described in making the talkout record. The playback arm is then raised in its pivot until it has snapped into place at its highest point in a manner similar to using said arm for ordinary playing back. Said arm is then positioned so that its needle is in the first groove of the desired message and the selector switch is turned to "Playback" position. The turntable will move and the message picked up by the playback arm will be expressed through the amplifier to the recorder and impressed on the small record. The fact, previously observed, that both the recording and playback elements are permanently in circuit, makes this possible.

*Figure 15.—Telephone dial lamps and filament current supply for amplifier*

A transformer 149 has a suitable winding 149–A which, via the conductors XX, Figure 15, supplies suitable current at six volts to the filaments of the tubes 151 and 152, and to dial lamps 207. These lamps are located immediately above the telephone dial 22 and are housed within the cover 21–A of the cabinet 21 so as to illuminate the dial when the handset 23 is removed from the hook switch 168. The hook switch is provided with an extra pair of normally open contacts 168–A for this purpose.

By this arrangement, low voltage lamps may be used to illuminate the telephone dial and the necessity to provide heavy contacts for standard lighting supply voltages is eliminated.

Figure 16:
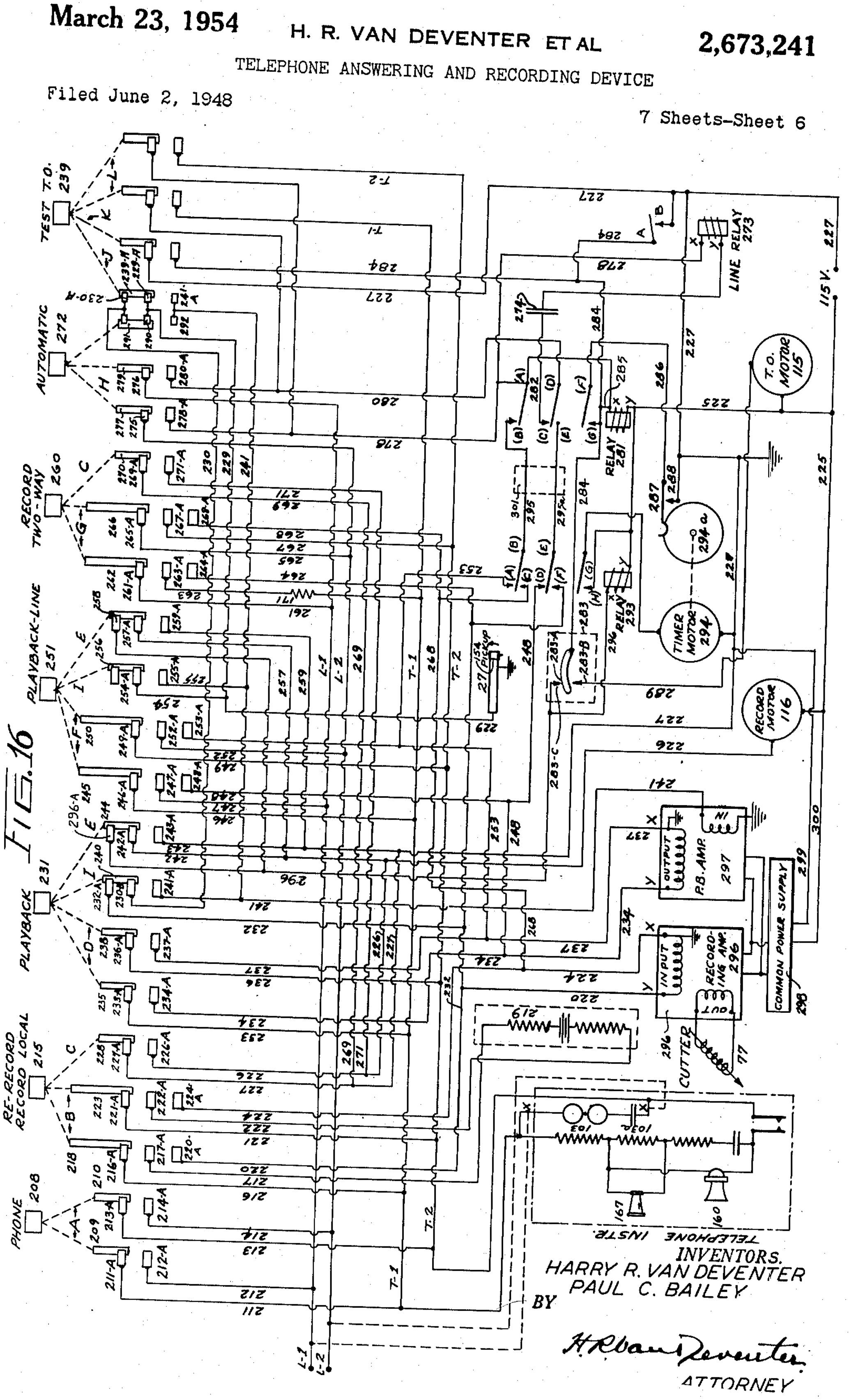
Figure 16 is an alternate schematic diagram of the wiring and control circuits.

*Fig. 16.—Alternate form of circuit*

Figure 16 shows an alternate form of wiring which may be used in place of the circuit shown in Figure 15. By the arrangement shown in Figure 16, any standard telephone instrument can be used or the usual telephone parts may be incorporated in the cabinet with the recorder and reproducer as described in connection with Figure 15.

The ringer 103 and condenser 103*a* may be connected across the incoming telephone circuit T–1, T2 and form part of the telephone instrument as shown in Figure 16, or may be disconnected from the telephone instrument, as shown at XX and connected directly across the telephone line circuit L–1, L–2 as shown by the dotted lines. In the latter event, the ringer is never disconnected from the telephone line circuit, regardless of the position of the push button keys hereinafter referred to.

Figure 16 differs from Figure 15 in that separate amplifiers 296, 297 are used for the recorder and reproducer respectively, said amplifiers being fed by a common power supply 298 connected to the power supply circuit, via conductors 299, 300 that supplies current to motors 115—116. The employment of the two amplifiers somewhat simplifies the circuit switching arrangement.

Figure 16 also discloses a local current supply 219 for the transmitter 160. While a battery is diagrammatically shown, it will be understood that this source of current may be obtained from a tap on the amplifier power supply such as 304 in Figure 17 or possibly through a transformer, rectifier, filter combination of its own.

In Figure 16, the switch keys or push buttons are of the well known interlocking and restoring type, so that when any one button is pushed, it will restore any other button that is in depressed position. As the construction of such keys is well known, they will not be described in detail. For the sake of simplicity, the usual telephone dial is omitted from Figure 16.

It will also be noted that the buzzer 193 and its associated circuits for producing a signal at the end of the talkout recording and as a warning signal for recording on the telephone line as shown in Figure 15, can be applied in a manner that will be obvious to the circuit in Figure 16, but has been omitted for the sake of clarity.

*Fig. 16.—The instrument used as a telephone*

Push button 208 is depressed and the circuit between contacts 211A and 212A is closed by bar 209 and thereby connects the T–1 side of the telephone instrument circuit to the L–1 side of the telephone line. By means of conductors 211 and 212 similarly, the circuit between contacts 213–*a* and 214*a* is closed by means of bar 210, connecting the T–2 side of the telephone instrument circuit to the L–2 side of the telephone line. By means of conductors 213 and 214 the telephone instrument is now used as usual.

*Fig. 16.—Record local—re-record*

Push button 215 is depressed and the circuit between contacts 216–*a* and 217–*a* is closed by means of bar 218 thereby connecting one side of the local current supply 219 to the T–1 side of the telephone instrument circuit by means of conductors 216 and 217. Also, through conductor 220 and contact 220–*a*, the Y side of the input of the recording amplifier 296 is connected to said T–1 side of the telephone instrument circuit. Bar 223 shorts out contacts 221–*a* and 222–*a* connecting through conductors 221 and 222 the other side of the local current supply to the T–2 side of the telephone instrument circuit, which same side is connected to the input of the recording amplifier 296 by conductor 224 and contact 224–*a*. One terminal of the recording motor 116 is connected to one side 225 of the A. C. supply line, the other side of said motor leading, via conductor 226 to contact 226–*a* which is in closed circuit with contact 227–*a* via bar 228 which leads, via conductor 227 to the supply line, so that when push button 215 is depressed, section B thereof connects the telephone instrument circuit to a local source of current for the transmitter and connects said combination to the input of the recording amplifier 296 and by means of section C, energizes the recording motor 116. The recording element 77 is always in circuit at the output of its amplifier.

It will be seen that, for the purpose of re-recording, the playback element 154 is connected into the recording amplifier via conductor 229 to contact 229–*a* of section J of push button 239, said contact being normally in closed circuit with contact 230–*a* which is connected, via conductor 230 to contact 230–*b* of section I of push button 231. Contact 230–*b* is normally in closed circuit with contact 232–*a* by means of bar 240, said contact being connected, via conductor 232, to conductor 220 which leads to the input of the recording amplifier 296. The other side 224 of said amplifier input like the other side of the playback element 154, is connected to a common conductor or "ground."

This circuit may be used to record, because the telephone circuit is connected across the input of the recording amplifier, the recording element 77 being always in circuit. This same circuit may be used to record because the playback element is also connected across said input. When one is being used, the other is static and vice versa.

*Fig. 16.—Playback*

Depressing push button 231 closes the circuit across contacts 233–*a* and 234–*a* by means of bar 235 of section D. Conductor 233 leads from trunk T–1 of the telephone instrument circuit to contact 233–*a*; and from contact 234–*a* a conductor 234 is connected to the Y side of the output of the playback amplifier 297. The other side of said output is led, via conductor 237, to contact 237–*a* which is in closed circuit with contact 236–*a* by means of bar 238 of section D. Contact 236–*a* is connected to the T–2 side of the telephone instrument circuit by means of conductor 236.

The playback element 154 of arm 27 is connected, via conductor 229, to contact 229*a* of push button 239 section J, said contact being in closed circuit with contact 230*a* by means of bar 239–*a*.

From contact 230–*a*, a conductor 230 is connected to contact 230–*b* of section I, push button 231, said contact being in closed circuit with contact 241–*a*, when push button 231 is depressed by means of bar 240. A conductor 241 is led from contact 241–*a* to the input of the playback amplifier.

By means of section E of push button 231, the recording motor 116 is energized. One terminal of said motor is connected to conductor 225, which conductor is one side of the A. C. supply line. The other side of said motor is led, via conductor 226 and conductor 242 to contact 242–*a* of section E of push button 231. Contact 242–*a* is in closed circuit with contact 243–*a* by means of bar 244 and contact 243–*a* is connected, via conductor 243 to A. C. supply conductor 227. Contacts 296A, 242–*a*, 243–*a* are connected, by conductors 296, 257 and 259 to contacts 258, 257–*a* and 259–*a* of section E of push button 251.

From the foregoing it will be seen that when push button 231 is depressed, the telephone instrument is connected across the output of the playback amplifier 297, the receiver 167 of said instrument serving as a sound reproducer; the playback element 154 is connected to the input of the playback amplifier to pick up sound from the record, and the motor used to move said record is energized.

*Fig. 16.—Playback over line*

Telephone instrument trunk lines T–1 and T–2 are led to contacts 246–*a* and 249–*a* by means of conductors 246 and 249. Contact 246–*a* is, by means of bar 245 of section F, in closed circuit with contact 247–*a*, which is connected to telephone line L–1 by conductor 247.

Contact 246–*a* is also, through bar 245, in closed circuit with contact 248–*a* which is connected to the Y side of the output of the playback amplifier 297 via conductors 248 and 234. From the T–2 side of the telephone instrument trunk line, a conductor 249 is led to contact 249–*a* which contact is by means of bar 250 of section F, in closed circuit with contact 252–*a*, which is connected via conductor 252 to the L–2 side of the telephone line. Contact 249 is also, through bar 250 of section F, in closed circuit with contact 253–*a* which is connected, via conductor 253, to the X side of the playback amplifier 297.

It will be noted that conductor 229, which is connected to the playback element 154 is connected, via conductor 254, to contact 254–*a*, said contact being in closed circuit with contact 255–*a* by means of bar 256 of section I of push button 251. Contact 255–*a* is connected, via conductor 255, to another conductor 241 which leads to the input of the playback amplifier. The motor 116 is energized by means of section E of push button 251.

The remainder of the circuit of "Playback Over Line" is the same as described in connection with the description of Figure 16, "Playback."

From the foregoing, it will be obvious that, when push button 251 is depressed, motor 116 will be energized, the playback element 154 will be connected into the playback amplifier 297 and the output of said amplifier and the telephone instrument circuit will be shunted across the telephone line L–1 and L–2.

*Fig. 16.—Record two way*

When push button 260 is depressed, contact 261–*a*, which is connected via conductor 261 to telephone line L–1, is in closed circuit by means of bar 262 on section G, with contact 263–*a* said contact being connected to one side of resistor 171, via conductor 265. The other side of resistor 171 is connected to the T–1 side of the telephone instrument circuit. Contact 261–*a* is also in closed circuit via bar 262, with contact 264–*a*, which is connected via conductors 264, 232 and 220 to the Y side of the input recording amplifier 296. Contact 365–*a* is connected to the L–2 side of the telephone line via conductor 265 and is in closed circuit via bar 266 of section G, with contact 267–*a*, said contact being connected, via conductor 267, to the T–2 side of the telephone instrument circuit. Contact 265–*a* is also in closed circuit via bar 266 of section G, with contact 268–*a*, said contact being connected by conductors 268, 224 to the X side of input of the recording amplifier 296.

Contact 269–*a* is connected, via conductor 269, to conductor 227 which is one side of the A. C. supply line. Said contact 269–*a* is in closed circuit by means of bar 270 with contact 271–*a*, which is connected, via conductors 271 and 226 to one terminal of the motor 116, the other terminal of said motor being connected to the other side 225 of the A. C. supply line.

It will be seen, from the foregoing description that, when push button 260 is depressed, motor 116 will be energized, the input of the recording amplifier 296 and the telephone instrument circuit T–1, T–2 will be shunted across the telephone line L–1 and L–2, said telephone instrument circuit having a serially included resistor 171 for the purpose of decreasing the output of the transmitter 160 so that same will record at approximately the same level as the incoming message.

*Fig. 16.—Automatic operation*

Depressing push button 272 simply shunts a relay 273 with a serially connected condenser 274 across the telephone line L–2 and L–2. This is accomplished by means of line L–1 being connected to contact 276 and line L–2 being connected to contact 275.

By means of bar 277 of section H, contact 275 is in closed circuit with contact 278–*a*, said contact being connected, via conductor 278, to terminal X of the line relay 273, terminal Y of said relay being connected to one side of a suitable condenser 274. Contact 276 is in closed circuit, by means of bar 279, with contact 280-*a* which is connected, via conductor 280, to the spring contact D of relay 281, said contact D being normally in closed circuit with its associated contact C which is connected, via conductor 282, to the condenser 274.

From the foregoing, it will be seen that the relay 273 and condenser 274 are in series across the telephone line, so that, when ringing current is applied to said line, relay 273 will be energized, closing its contacts A and B. Contact B of said relay is connected to conductor 227 which is one side of the A. C. supply line. Contact A of the same relay is led, via conductor 284, to the pole 283-*a* of switch 283, said switch being operated by the movement of the playback arm 27 in the record grooves as previously described. Contact A of relay 273 is also connected to terminal X of relay 281 by conductor 285, terminal Y of said relay 281 being connected at all times to conductor 225, one side of the A. C. supply line. Thus it will be obvious that when relay 273 is energized by the ringing current, relay 281, by means of contacts A and B of relays 273 will also be energized and, as the closure of the A and B contacts on relay 273 is only momentary, relay 281 must be held in energized condition by means of its spring contact F, which is connected, via conductor 286 to the timer contact spring 287 which is in normally closed relationship with its associated contact 288, said contact being connected to conductor 227, one side of the A. C. supply line. Contact G of relay 281 is connected to terminal X of said relay, so that when relay 281 is momentarily energized, its contacts F and G close, thus connecting the X side of the relay 281 to the 227 side of the A. C. supply.

From contact 283-*b* of switch 283, a conductor 289 is led to the talkout motor 115, the other side of said motor being connected to the 225 side of the A. C. supply line.

The playback element 154 is connected into the playback amplifier 297 through conductor 229, contacts 290, bar 291, contact 292, and conductor 241. The Y side of the output of said amplifier is connected, via conductor 248 to contact D of relay 293, said contact being normally closed with contact E of the same relay. Said contact E is connected to contact E of relay 281, said contact E of 281 during the talkout message being in closed circuit with contact spring D of relay 281, said contact being connected, via conductor 280, contacts 280-*a*, and 276 to the L-1 side of the telephone line. Similarly, the X side of the playback amplifier's output is connected, via conductors 237 and 253 to contact A of relay 293, said contact being normally closed with contact B of the same relay. Contact B is connected, via conductor 295 to contact B of relay 281 which is normally closed with contact A of the same relay, said contact being connected to the L-2 side of the telephone line.

When the talkout message is finished, arm 27 moves contact spring 283-*a* into closed circuit with contact 283-*c*, breaking contact 283-*b* and de-energizing the talkout motor 115. Said action applies current to the X side of relay 293 via conductor 296, the Y side of said relay being connected to the 225 side of the A. C. supply line, energizing said relay, which through its contacts B and C, E and F put the input of the recording amplifier 298 across the telephone line L-1 and L-2. Also, in closing contacts 283-*a* and 283-*c*, current is applied to the recording motor 116 and the timer motor 294 via closed contacts 244 and 242-*a* of push button 231.

At the end of the recording period, the length of which is determined by the setting of a timer described, the timer contacts 287 and 288 open momentarily, thus de-energizing relay 281 which, through its contacts F and G, de-energizes relay 293. As the playback arm 27 is raised and lowered in its relation to the talkout record by the operation of relay 281, the de-energizing of relay 281 will return said playback arm to its starting position, thereby closing contacts 283-A and B and placing motor 116 in circuit, ready to start upon the operation of relays 273 and 281.

The timer is of a well known variety having a motor 294 which drives a cam or disc 294-*a* at some predetermined rate, for example at one R. P. M. This cam or disc may be set in relation to its starting point to momentarily open contacts 287 and 288 at any point in its revolution say, after thirty seconds and, as this breaks the circuit to the motor 294, the disc automatically returns to its starting point so that the timer is reset after each operation.

*Fig. 16.—Testing the talkout record*

The operation of the circuit when push button 239 is depressed is identical with "Automatic"; with the exception that through section K, relay 273 is energized, thus starting the cycle of operations. By means of section L, the telephone instrument is connected into the circuit so that the talkout message may be heard in the receiver 167 thereof.

A repeating coil 301 may have its A winding connected to conductors 295—295*a* and its B winding connected to the B and E contacts of relay 291, thereby inserting the coil or any other suitable coupling arrangement in the circuit as shown. By this arrangement any direct connection between the telephone line and the other component parts of the system is avoided, as more fully described in connection with Figure 17.

Figure 17:
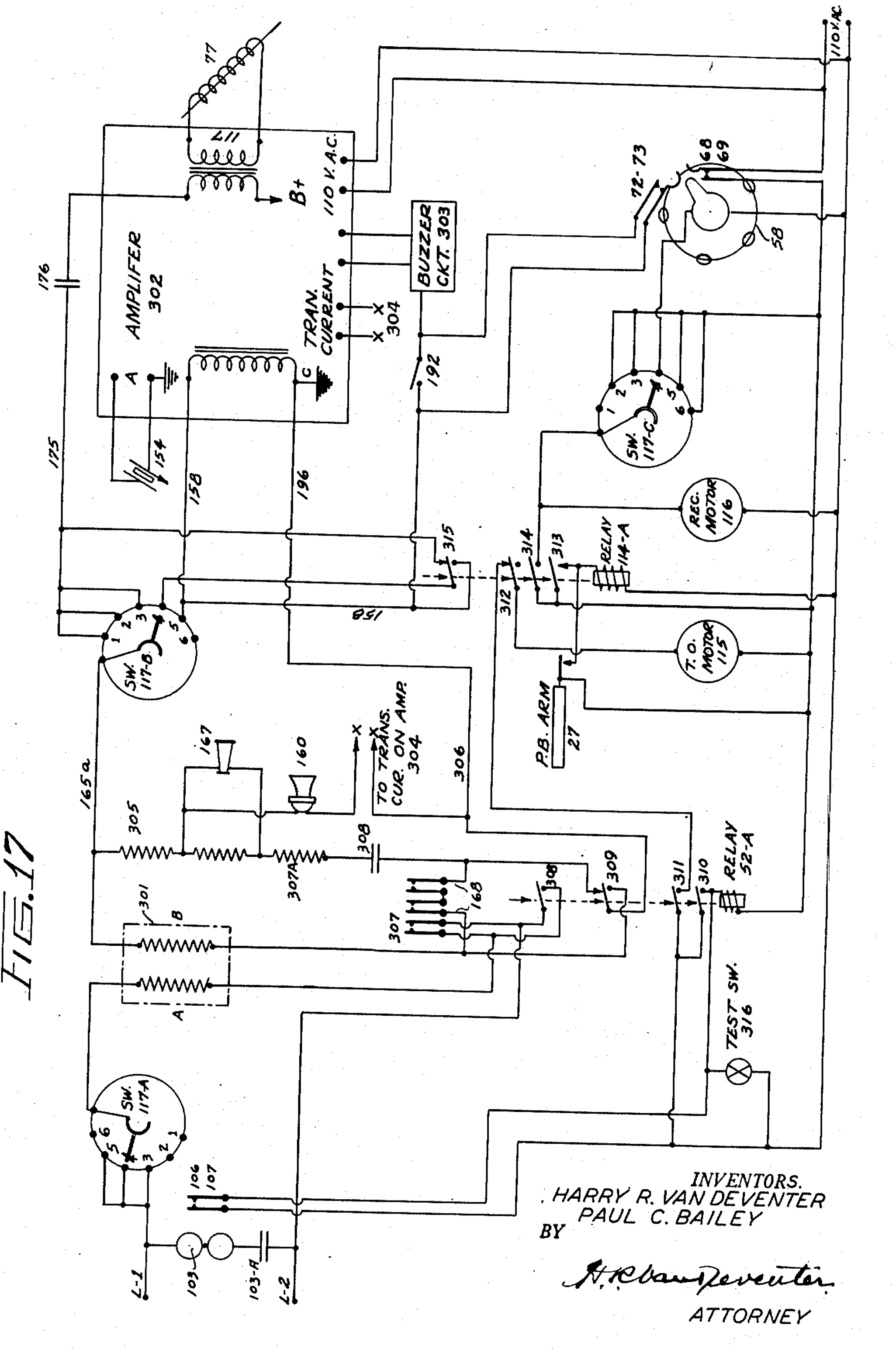
Figure 17 is still another alternate schematic diagram of the wiring and control circuits.

*Figure 17.—Alternate form of circuit*

Figure 17 shows an alternate form of wiring which may be used in place of circuits shown in Figures 15 and 16.

In Figure 17 it will be understood that a standard telephone handset and other parts such as the transmitter and receiver may be employed. The ringer 103 is equipped with contacts 106 and 107 as described in connection with Figure 15. A repeating coil 301 is arranged for connection between the telephone line circuit L-1, L-2, the telephone handset and other parts. If desired, the ringer 103 and condenser 103A can be connected across winding B of coil 301 instead of as shown. A single amplifier 302 is employed, to which the reproducer 154 and the recording head 77 are connected as described in connection with Figure 15.

The buzzer circuit generally indicated at 303 is the same as that shown in Figure 15 and produces the signal to be recorded on the talkout record as previously described and may also, via contact 72 and 73 on the timer 194 produce the warning signal to be recorded along with incoming messages received via the telephone line circuit.

Further details not hereinafter described are substantially as shown in the preceding figures, so that the wiring of Figure 17 is not described in detail as it is believed that this will be readily understood from the following description of the circuit.

*Fig. 17.—Recording locally using the telephone as a microphone*

The switches 117A, B and C having a common handle and being on position No. 6, the telephone line circuit L1, L2 is open through winding A of coil 301 at contact 6 of switch 117-A, so that the telephone line circuit is not affected while the telephone transmitter is in use for recording locally.

The transmitter is supplied with current via a suitable source connected to conductors 304. This may be a tap from the amplifier current supply of amplifier 302.

Recording motor 116 is energized via contact 6 of switch 117C and the translating device or cutter 77 is energized as previously described and is connected to the output 177 of the amplifier.

The amplifier input 158 is connected via contact 6 in switch 117B and contact 166 therein via conductor 165*a* to induction coil winding 305 and to transmitter 160; through current supply 304 to conductors 306 and 196 to common circuit C of amplifier 302. Thus the telephone transmitter is connected to the input of amplifier 302 and the cutter 77 to the output thereof and will record sound spoken into the transmitter on the record operated by the motor 116.

*Figure 17.—Playback and re-record using the receiver of the telephone instrument*

The switches 117A, B and C having a common handle and being on position No. 2, the telephone line circuit is open through winding A of coil 301 at contact 2 of 117A so that the telephone line circuit is not affected while the telephone receiver is in use for playback.

Recording motor 116 on the turntable of which lies the record which is to be played back, is energized via contact 2 of switch 117C and the translating device or playback arm 154 is energized as previously described and is connected to the A input of amplifier 302.

The amplifier output 175 is connected via contact 2 in switch 117B and contact 166 therein, via conductor 165*a*, to induction coil winding 305 and to receiver 167 and, via the induction coil winding 307-*a* and condenser 308 to conductors 306 and 196 to the common circuit C of the amplifier 302. Thus the telephone receiver is connected to the output of amplifier 302 and the translating device at playback element 154 to the A input thereof and sounds produced by the playback element will be heard in the telephone receiver 167.

The process of re-recording on this position No. 2 of the switch 117 is the same as described in connection with Figure 15.

*Figure 17.—Playback over line*

The switches 117A, B and C having a common handle and being on position No. 3, the telephone line circuit is connected in series with winding A of coil 301, the telephone handset being off the hook switch 168 and all of the contacts, including those indicated at 307, being closed.

Switches 117B and 117C, being in position 3 which is cross connected to position 2, the operation of these switches, the amplifier 302, recording motor 116 and reproducer 154 is the same as previously described except that, in position 3, the telephone line circuit is connected to that a party at a distant station may hear the playback over L-1, L-2.

*Figure 17.—Automatic*

The switches 117A, B and C, having a common handle and being on position No. 4, the telephone line circuit is completed through winding A of coil 301 to the normally open contacts 307 of the hook switch 168 on which the telephone handset rests, said hook switch contacts remaining open during automatic operation.

In multiple with contacts 307 are the normally open contacts 308 of relay 52-A which, when closed, complete the telephone line circuit through winding A of coil 301 thereby extinguishing the supervisory lamp at the exchange or operating an automatic system to hold the connection between the calling and this called line.

Upon the telephone ringer 103 being operated in the usual way, contacts 106 and 107 thereof close the 110 volt supply circuit in a manner that will be obvious, through the winding of relay 52A which closes all of its contacts.

The contacts 308 close the telephone line circuit as just described.

Contacts 309 close a circuit, including winding B of repeating coil 301. Thus, via conductor 165A, position 4 of switch 117B, conductors 175, 306 and 196 connect the B output of amplifier 302 to the telephone line circuit, the same being inductively coupled thereto via the repeating coil 301.

When relay 52A closes, its locking contacts 310 lock the relay across the 110 volt current supply through the normally closed contacts 68 and 69, said contacts being in their closed circuit position and the timer not yet being in operation.

Contacts 311 in relay 52A also close, placing the talkout motor 115 across the 110 volt supply line in series with the contacts 312 of the midcycle relay 114-A and said motor begins to operate to move the record, actuating the playback arm 27 as previously described and the recorded message is delivered to the calling party over the telephone circuit L-1, L-2.

It will be understood that when the starting relay 52A operates, it permits the playback arm 27 to come into translating relationship with its associated record and that the operation of relay 32A and motor 115 is practically simultaneous.

When the delivery of the recorded message has been completed, the playback arm 27 has moved as previously described, to close the switch 41 thereon, which connects the relay 114A across the 110 volt supply circuit and said relay operates, breaking its contacts 312, thereby stopping the operation of the reproducer motor 115. This relay also closes its holding contacts 313 thereby locking itself across the 110 volt supply circuit independently of switch 41. The relay 114A also closes a contact 314 thereby placing the recording motor 116 across the 110 volt supply circuit and, as switch 116A is also connected to this contact and is in position 4, the timer 194 which may be of the motor driven type shown at 295, Fig. 17 and described in connection therewith, begins to operate.

Relay 114A also operates its contacts 315 to disconnect the output 175 from the conductor 165A leading to the repeating coil 301 and to connect said conductor 165A to input B (transformer 156) of the amplifier via conductor 158. The result is that any incoming speech on the telephone line circuit L-1, L-2 will pass into the amplifier and will be recorded by the cutter 77 on the record operated by motor 116.

The recording will continue for the period set by the timer 194. When the end of this period is reached, the timer momentarily opens its contacts 68, 69, and relays 52A and 114A are restored to normal, awaiting the next incoming call, whereupon the above cycle of first answering the calling party and then recording his message, will be repeated.

It will be observed that in any of the circuits shown in this application, if desired, the telephone answering feature only may be used, and the use of the recording motor 116 together with its associated equipment may be dispensed with, or the cutter arm 28 may be swung back to its rest and not used.

*Figure 17.—Testing the talkout record*

The switch 117A, B and C, having a common handle and being on position No. 1, the telephone line circuit through repeating coil 301 is open as previously described.

The amplifier output circuit 175 is connected to the telephone receiver 167 as previously described. Switch 117C which controls the timer, is open.

If now push button 316 is pressed, it will place the starting relay 52A across the 110 volt supply line and said relay will, as previously described, place the motor 115 in operation. The playback arm 27 will be moved in relation to the record and the recording will be heard in the receiver 167, as fully described under the heading "Automatic," Figure 17. Relay 114A will be operated by switch 41 at the end of the recording.

By repeatedly setting the arm 27 and adjusting the disc 44 and screw 54, as previously described, the arm can be properly set to start and terminate a reproduction at the proper time.

*Figure 17.—Record two-way*

This operation is performed with the switches 117A, and C in position No. 5 and the operation is exactly the same as explained in connection with "Recording Locally," Figure 17 previously described, except that switch 117A connects the A winding of the repeating coil 301 across the telephone line circuit L-1, L-2, the handset being off the hook switch 168 and all of the hook switch contacts including 307 being closed.

The result is that the recorder is not only connected to the instrument with which it is associated, but also receives, via repeating coil 301, the incoming speech over the telephone circuit L-1 and L-2 so that a record may be made of a speech passing over L-1, L-2 in both directions.

It will be observed by those skilled in the art that repeating coil 301 constitutes a coupling means between the telephone instrument circuit and its associated line L-1, L-2 and that instead of this coil, any other coupling means such, for example as condensers, can be used, in which case contacts 307 and 308 would be so arranged as to complete a direct current path across the line circuit L-1 and L-2 and including a suitable limiting resistance if desired.

From the foregoing description it will be evident that the telephone instrument is so combined with its associated phonograph that the telephone transmitter and receiver are used for recording and reproducing speech in connection with said phonograph, thereby eliminating the usual recording microphone and speaker ordinarily used.

This not only lessens the cost of the complete telephone answering and recording device, but also makes it more compact so that the user has in one cabinet not only the usual telephone instrument but also the apparatus for answering the incoming telephone calls and taking messages received via the telephone line circuit.

As pointed out herein, in some instances, the telephone instrument complete with ringer, is connected to the circuits of the complete device and in other instances the ringer or an equivalent relay responsive to ringing current may be spaced apart from the telephone instrument at all times regardless of the positions of the selector switch 117.

It will also be obvious that while in the embodiment of the invention described in connection with Figures 1 and 2 the telephone instrument is incorporated in and has its parts mounted on the chassis within the cabinet, that said telephone instrument could be of the usual variety and mounted on the side of the cabinet or upon the lid thereof and connected to its associated phonograph equipment by means of the usual two conductor cord in common use.

All such modifications are deemed to be within the scope of the appended claims.

What is claimed is:

1. In combination with a telephone line circuit including a connection to a remote source of direct current for use in conveying intelligence, a telephone instrument including a transmitter and receiver; connection means between said instrument and said line including a switch, commonly termed "hook switch," for connecting said instrument to said circuit, a phonograph including an amplifier having input and output circuits, electrical translating means, a local source of current, and switch means included in a circuit with said transmitter, said input circuit, translating means, and said local source of current for disconnecting said transmitter from said line and connecting the same to said local source, said switch means also adapted to connect said output circuit to said translating means thereby conditioning the transmitter to be used as a recording microphone for said phonograph, while the latter is disconnected from said telephone line circuit.

2. In a device of the character described, a telephone line circuit, a cabinet having a telephone dial mounted thereon, a lamp for illuminating said dial, a telephone instrument mounted on said cabinet, said instrument including a receiver and a transmitter, connections between said line circuit and said instrument including a switch commonly termed a "hook switch," contact means on said hook switch connected in series with said lamp and connected to said line circuit, a thermionic amplifier in said cabinet including an input circuit and an output circuit, means to supply energy to said amplifier, a reproducing phonograph connected to said input circuit, and switch means connected in a circuit with said output circuit and said line circuit for delivering intelligence from said phonograph to said line circuit.

3. In a device of the character described, a telephone line circuit, a cabinet having a telephone dial mounted thereon, a lamp for illuminating said dial, a telephone instrument mounted on said cabinet, said instrument including a receiver and a transmitter formed into a handset and mounted above said dial, a hook switch in cooperative relation with and actuated by said handset, said hook switch including sets of contacts, circuit means between said instrument and said line circuit and including a set of contacts in said hook switch, a second circuit means between said line circuit and another set of contacts in said hook switch and said lamp, both said circuit means cooperating to connect said instrument to said line circuit and to illuminate said lamp when said handset is disengaged from said hook switch, a phonograph in said cabinet, switch means connected in a circuit between the output of said phonograph and said line circuit, and a common source of current for supplying energy to both said phonograph and said lamp.

4. In apparatus of the class described, the combination with a telephone line circuit, of a telephone instrument including a transmitter and a receiver, a hook switch having sets of cooperating contacts; circuit means between said transmitter and said receiver, one set of said contacts and said line circuit for connecting the latter to said transmitter and receiver, phonograph mechanism, means including circuit means between the output of said phonograph mechanism and said line circuit for connecting them together, said means also including cooperative contacts connected to another of said sets of hook switch contacts to short circuit the latter, and thereby connect said transmitter and receiver to said line circuit while said switch hook is inoperative.

5. In apparatus of the class described, the combination with a telephone line circuit, of a telephone instrument including a transmitter and a receiver, a hook switch having sets of cooperating contacts; circuit means between said transmitter and said receiver, one set of said contacts and said line circuit for connecting the latter to said transmitter and receiver, a signalling device connected to said line circuit, phonograph mechanism including means to record sound on a record, and means including a plurality of sets of contacts, a set of which is connected in series with said one set of contacts and said line circuit for disconnecting the latter from said telephone instrument, and another set of which is included in a circuit with said transmitter and said means to record, said last mentioned set being closed as the series connected set opens, thereby enabling said transmitter to effect the recording of sound on said record while said signalling device is connected to said line circuit.

6. In a device of the character described, a telephone having a transmitter, a phonograph mechanism including a record blank and means to record sound thereon, switch mechanism included in circuit between said transmitter and said means to record for connecting the latter to and for disconnecting it from said transmitter, driving means for said phonograph mechanism, a source of current, an operating circuit connected to said source and to said driving means, and a limit switch in said operating circuit means whereby said switch is actuated by an element of said phonograph mechanism to open said operating circuit and stop the operation of said phonograph.

7. In apparatus of the character described, a chassis including a substantially horizontal mounting plate, a telephone line circuit, a phonograph mechanism including a record blank and means to drive the same, means mounted above said plate and connected to said line circuit for recording sound received via said circuit on said record, switch means in the connections between said line circuit and said means to record for connecting the latter to and for disconnecting it from said line circuit, an operating circuit connected to a source of current and to said means to drive said phonograph mechanism, a limit switch connected in series with said switch means, means actuated by the movement of said phonograph mechanism when the latter has reached a predetermined point to disconnect said means including an amplifier for recording from said line circuit, said limit switch including an actuating plunger extending through said plate.

8. In a device of the character described, a telephone line circuit, a reproducer mechanism having translating means and means to move a record, a record on said last means having a recording thereon, circuit means connected to said line circuit and to said translating means to deliver the translated recording to said line circuit, switch means in said circuit means and including settable means for effecting its actuation in accordance with the length of said recording for disabling said circuit means, a recorder and means to drive the same, and a second circuit means connected to said line circuit and to the output of said recorder and including a switch movable by said switch means to a circuit enabling position as said switch means is moved to a circuit disabling position, thereby connecting said recorder to said line circuit as said reproducer mechanism is disconnected therefrom.

9. In combination with a telephone instrument having a transmitter and a receiver, recording and reproducing phonograph means including an amplifier having input and output terminals, circuit means between at least said transmitter and said amplifier input terminals including switch means to be closed, whereby said transmitter may be used to transmit sound to be recorded by said phonograph, and a second circuit means including a switch to be closed between said amplifier output terminals and at least said telephone receiver, whereby sounds reproduced by said phonograph may be heard via said receiver.

10. The invention according to claim 9, wherein a telephone line circuit is provided, a third circuit means between said line circuit and said instrument including a switch for connecting the instrument to said line circuit for ordinary telephone purposes, a fourth circuit means for connecting said output to said line to deliver a reproduction of a sound recording thereto, and yet another circuit means connected to said input and said line circuit and said instrument, whereby said phonograph may record telephonic transmission received over said line circuit.

11. The combination with a telephone line circuit of a telephone handset including the usual transmitter and receiver, switch means in a circuit connected to said line and to said handset for connecting said transmitter and receiver therein to said line circuit for use as an ordinary telephone to receive and transmit speech, a recorder including means to support and move a record, means for recording speech on the latter, an amplifier having an input circuit, and other switch means connected in a circuit with said handset and the input of said amplifier for connecting said transmitter to said input in order to record speech on said record, a cradle on a cabinet supporting said handset, said cabinet supporting said means for recording, said first switch means having a movable element cooperating with said cradle so that said first switch means is operated by the removal and replacement of said handset on said cradle.

12. The combination as claimed in claim 11 wherein said cabinet also supports a telephone dial device which is interconnected with the line circuit when a call is being made.

13. In combination with a telephone line circuit, a telephone handset including a transmitter and receiver, a phonograph including an amplifier having input and output terminals, switch means connected in a circuit with said handset and said telephone line circuit for connecting said transmitter and receiver therein to said line circuit for use as an ordinary telephone to receive and transmit speech, other switch means connected in a circuit with said handset and the input terminals of said amplifier for connecting said transmitter to said phonograph for recording speech delivered to said transmitter, and yet another switch means connected in a circuit with at least the receiver in said handset and the output of said amplifier for connecting said receiver to the output of said phonograph, whereby sounds produced by said phonograph may be heard in said receiver.

14. In combination, a cabinet, a telephone line circuit terminating in said cabinet, a telephone transmitter and receiver supported by said cabinet, switch means in said cabinet connected in a circuit with said transmitter and receiver and said line circuit for completing said last circuit to enable conversations to be effected thereover, a reproducing phonograph in said cabinet, switch means in said cabinet connected to the output of said phonograph and to said line circuit for connecting said output to said line circuit, and means in said cabinet for determining the length of time said phonograph is so connected.

15. In combination, a cabinet, a telephone line circuit terminating in said cabinet, a telephone transmitter and receiver supported by said cabinet, switch means in said cabinet included in a circuit with said line circuit and said transmitter and receiver for connecting said transmitter and receiver to said line circuit for telephonic purposes, a reproducing phonograph in said cabinet having output terminals, other switch means in said cabinet in a circuit with said output terminals and said line circuit for connecting said phonograph to said line circuit, a recording phonograph in said cabinet having input terminals, yet other switch means in said cabinet connected in a circuit with said input terminals for connecting said recording phonograph to said line circuit, and means in said cabinet for individually timing the periods both said phonographs are so connected.

16. The combination as claimed in claim 15 wherein said last means includes a timer connected to and operated by the movement of said reproducing phonograph.

17. The combination as claimed in claim 15 wherein said last means includes a timer having a motor connected in circuit with said reproducing phonograph.

18. In combination, a telephone instrument, a telephone line circuit, a reproducing phonograph having output terminals, switch mechanism connected in a circuit with said instrument and said line circuit for connecting said telephone instrument to said line circuit, other switch mechanism in a circuit with said output terminals for connecting said phonograph to said line circuit, yet other switch mechanism included in a circuit with said output terminals and said instrument for connecting said phonograph to said telephone instrument, and a cabinet upon and in which the aforesaid instrumentalities are mounted in cooperative relationship to form a compact unit.

19. In combination, a telephone line circuit a telephone instrument having a receiver and a transmitter, a reproducing phonograph having output terminals, switch mechanism included in a circuit with said instrument and said line circuit for connecting said telephone instrument to said line circuit, other switch mechanism included in a circuit with said output terminals and said instrument for connecting said first phonograph to said telephone instrument, a recording phonograph having input terminals, switch mechanism included in a circuit with said input terminals and said line circuit for connecting said recording phonograph to the latter and a cabinet upon and in which the aforesaid instrumentalities are mounted in cooperative relationship to form a compact unit.

20. The combination as claimed in claim 19 including other switching means in said cabinet connected in a circuit with said input terminals and said line circuit operated by the movement of said reproducing phonograph to disconnect same from the telephone line circuit and to connect said recording phonograph thereto.

21. The combination as claimed in claim 19 including switch means in said cabinet connected in a circuit with said input terminals and said line circuit and having closed contacts in the aforesaid circuit including the output terminals and said line circuit and operated by the movement of said reproducing phonograph to disconnect same from the telephone line circuit and to connect said recording phonograph thereto, and a timer in said cabinet operatively connected to a switch in said circuit with said input terminals and said telephone line adapted to disconnect said recording phonograph from said telephone line circuit after a predetermined time elapses.

22. The combination as claimed in claim 19 including switching means in said cabinet connected in a circuit with said input terminals and said telephone line and having closed contacts in the aforesaid circuit, including the output terminals and said line circuit and operated by the movement of said reproducing phonograph to open said contacts to disconnect the latter from the telephone line circuit and to connect said recording phonograph thereto, and means in said cabinet including a timer having contacts included in the circuit with said first contacts for reconnecting said reproducing phonograph to the telephone line circuit upon the completion of said predetermined recording time.

23. In apparatus of the class described, a telephone line circuit, a cabinet having a lid, a telephone cradle supported by said lid, a telephone handset adapted to be supported on said cradle to operate a hook switch in the usual manner and including the usual transmitter and receiver, a hook switch mounted on said lid and included in a circuit with said transmitter and receiver and with said line circuit and adapted to connect said transmitter and receiver to said line circuit, a reproducer in said cabinet including means to support and move a record, a record carried thereby, translating means cooperating with said record for reproducing speech therefrom and having output terminals and switch means in said cabinet included in a circuit with at least said receiver and said output terminals adapted to connect said receiver to said reproducer so as to receive speech therefrom.

24. The combination as claimed in claim 23 including a signal responsive signalling device in said cabinet including switching means connected to a source of current and to driving means for said reproducer and adapted to be actuated by current received via said telephone line circuit to start the operation of said reproducer, and other switching means in said cabinet included in the circuit with said source for stopping the operation of said reproducer and restoring said translating means to its starting position.

25. The combination as claimed in claim 24 wherein said signalling device includes a telephone ringer.

26. The combination as claimed in claim 24 including a device in said cabinet connected in the circuit with said signalling device and adapted to be actuated by current received over said telephone line circuit to start the operation of said reproducer, and other switching means in said cabinet including timer controlled contacts and means for operating same, said timer controlled contacts included in circuit means with said source and driving means for said reproducer thereby controlling the operation of said reproducer.

27. A telephone line circuit, an amplifier having first and second sets of input terminals and first and second sets of output terminals, a reproducer connected in a circuit with said first set of input terminals, switch means included in a circuit with said first set of output terminals and said line circuit for connecting said first output circuit to said telephone circuit, a second switch means connected in a circuit with said second set of input terminals and said line circuit for connecting said telephone circuit to said second input circuit, and a recording mechanism having input terminals connected in a circuit with said second output terminals, motor means for driving said mechanism and moving a record on which sound is to be recorded, said second switch means also having cooperative contacts connected in circuit with said motor means and a source of current.

28. The combination as claimed in claim 27 including other switch means connected in a circuit with said line circuit and the terminals of said second output circuit and operated by said motor for disconnecting said second output circuit from said telephone line circuit.

29. In combination, a telephone line circuit, a transmitter and receiver, a first switch means including a circuit with said line circuit and said transmitter and receiver for connecting said transmitter and receiver to said telephone circuit for telephonic purposes, a transformer having a first and a second winding, a second switch means included in a circuit with said line circuit and said first winding for connecting said first winding to said line circuit, a third switch means having contacts in a circuit with and cooperating with said second switch means for short-circuiting said first winding when said second switch means is in open circuit position, an amplifier having a first set and a second set of input terminals, a phonograph reproducer having output terminals connected to said first set of input terminals, said amplifier having a first set and a second set of output terminals, a fourth switch means connected in a circuit with said line circuit and said first set of output terminals for connecting said first output terminals of the amplifier to said telephone line circuit, and a phonograph recorder having input terminals connected in a circuit with said second set of output circuit terminals.

30. The combination as claimed in claim 29 where said switch means comprises a gang switch mechanism operable by a single handle or knob.

31. The combination as claimed in claim 29 including means for producing signal tone impulses, terminals therefor and a fifth switch means included in a circuit when said last terminals and one of said sets of input terminals for connecting same to said last input terminals to impress said tone impulses upon a record via the circuit connected to said second set of output terminals and the input terminals of the recorder coupled thereto.

32. In combination, a telephone line circuit including a connection to a remote source of direct current, a telephone instrument including a transmitter and receiver and adapted to receive and transmit speech over said line circuit, a hook switch having sets of contacts, one set of which is included in a circuit with said line circuit and said instrument, whereby said transmitter receives its current supply from said source via said line circuit, operative switch means connected in a circuit with a local source of current and with said instrument for directly connecting said local source to said transmitter in said instrument, a recorder including an amplifier having input terminals, and another switch means connected in a circuit with the input terminals of said amplifier and with said instrument for connecting said recorder to said instrument to record sounds via said transmitter when said operative switch means is closed and current supplied from said local source energizes said transmitter.

33. In combination, a telephone line circuit including a connection to a remote source of current, a telephone instrument including a transmitter and receiver and adapted to receive and transmit speech over said line circuit, said transmitter receiving its current supply from said remote source via said line circuit, hook switch means having a set of contacts connected in a circuit with said line circuit and said instrument for connecting and disconnecting said instrument from said circuit, a reproducer mechanism including an amplifier and means to support and move a record and having a recorded message on a record thereon, said amplifier having output terminals, switch means connected to said output terminals and to said line circuit, a recorder mechanism including a motor and an amplifier having input terminals, switch means having one set of contacts connected to said output terminals and said line circuit and another set of contacts connected to said line circuit and said input terminals for disconnecting said reproducer from said line circuit and connecting said recorder thereto, and timing switching means having contacts connected to said line circuit and other contacts cooperating with said input terminals for predetermining the length of time said recorder is connected to said line circuit and for disconnecting same therefrom upon the completion of said time.

34. In combination, a telephone line circuit including a connection to a remote source of current, a telephone instrument including a transmitter and receiver and adapted to receive and transmit speech over said line circuit, said transmitter receiving its current supply from said remote source via said line circuit, hook switch means having a set of contacts connected in a circuit with said line circuit and said instrument for connecting and disconnecting said instrument from said circuit, a reproducer mechanism including an amplifier and means to support and move a record and having a recorded message on a record thereon, said amplifier having output terminals, switch means included in a circuit with said output terminals and said line circuit for connecting said reproducer to said line circuit, a recorder mechanism including a motor and an amplifier, said last amplifier having input terminals, other switch means having one set of terminals connected in a circuit with said output terminals and said line circuit and actuated in time with the termination of said recorded message and having a second set of terminals oppositely disposed and connected in a circuit with said line circuit and said input terminals for disconnecting said reproducer from said line circuit and connecting said recorder thereto, and timer switch means including a pair of cooperating contacts in series with the circuit to the input terminals for predetermining the length of time said recorder is connected to said line circuit and for disconnecting same therefrom upon the completion of said time.

35. The combination as claimed in claim 34, wherein one of said contacts of said timer switch means is mechanically operated by the movement of said reproducer mechanism.

36. The combination as claimed in claim 34, wherein said means for predetermining the length of time said recorder connected to said line circuit includes a rotary timing device is connected to said source of current and operated in unison with said recorder motor.

37. The combination as claimed in claim 34 wherein said means for predetermining the length of time said recorder is connected to said line circuit includes a motor driven timer the motor of which is connected in parallel with said recorder motor, and both said motors being included in a circuit with a source of current.

38. In an apparatus of the class described, a telephone line circuit, a telephone instrument including a transmitter and receiver, a first switch key having contacts connected to said line circuit and to said instrument for connecting said instrument to said circuit, a recorder having input terminals, a second switch key having contacts connected to said input terminals and said instrument for connecting said instrument to said recorder, whereby said transmitter may be used to record messages in said recorder, a reproducer having output terminals, a third switch key having contacts connected in a circuit with said instrument and said output terminals for connecting said instrument to said reproducer, whereby said receiver may receive messages from said reproducer, a fourth switch key having contacts connected in a circuit with said line circuit and said output terminals for connecting said reproducer to said line circuit, a fifth key having contacts connected in a circuit with said input terminals and said line circuit and having other contacts connected to said instrument and to said input terminals for connecting said recorder to said line and also to said instrument, a sixth switch key having sets of contacts, circuit means and instrumentalities controlled thereby including drive motors for said recorder and said reproducer and circuit means therefrom to a source of current, whereby incoming signalling circuit over said line will start said reproducer and connect same to said line to deliver a message thereto, then disconnect said reproducer and connect said recorder to the line to record incoming messages, all said keys being interconnected in interlocked relation whereby, as any one key is operated, any previously operated key is thereby restored to normal non-operating position.

39. The combination as claimed in claim 38 including a seventh switch key in interlocked relation with said other keys and having contacts connected in a circuit with said source and the drive motor of said reproducer and other contacts in a circuit including said output terminals and said instrument for starting said reproducer and connecting same to said instrument to deliver a message thereto.

40. In a device of the class described, a telephone line circuit, a reproducer having output terminals connected to said line circuit and adapted to deliver a reproduction of a recorded message to said telephone line circuit, said reproducer including a record and a translator, said record and said translator having an initial starting position, means for relatively adjusting said device and record at said starting position to vary the time at which said record begins to reproduce sound, a recorder having a translator connected to circuit means and adapted to record an incoming message received via said telephone line circuit, and contact means and a circuit connected thereto and to said recorder and a source of power for starting the operation of said recorder, means for operating said contact means including cooperating members on said recorder and contact means said last means including an adjustable member whereby the time after said record ceases and said recorder begins recording can be varied.

41. In a device of the class described, a telephone line circuit, a reproducer having output terminals, a pick-up arm having other terminals, a recorder having input terminals, switch means having contacts connected to said output terminals and to said line circuit and having other contacts opposite said first contacts and connected in a circuit with said input terminals and said line circuit for disconnecting said reproducer from said circuit and for connecting said recorder thereto, and means for operating said switch means including cooperating members on said arm and said switch means for operating the latter when said arm is moved.

42. In combination, a telephone circuit, a phonograph recorder having input terminals connected to said circuit, motor means to operate said recorder, a timer switch having contacts connected in a circuit with said input terminals and said line circuit for controlling the time said phonograph is connected to said circuit, means for producing a high frequency tone, a circuit connected to said means, and switch means having contacts connected to said high frequency circuit and to said timer and operated by said motor for controlling said high frequency circuit, said switch means being connected to said telephone circuit and being timed to be actuated at pre-set intervals to impress a signal produced by said tone producing means on said telephone circuit.

43. In combination, a telephone line circuit, a recorder having input terminals and including a record blank, timer switch means connected in a circuit with said line circuit and said input terminals for connecting said recorder to said circuit for a predetermined time, means for producing signal tone impulses, and means including a circuit connected to said input terminals for impressing said tone at predetermined intervals on said record while said recorder is connected to said circuit.

44. In combination, a telephone line circuit, a telephone instrument, a phonograph recorder having input terminals connected directly to said line circuit, manually operable switch means connected in an operative circuit with said line circuit and said instrument for connecting said telephone instrument directly to said line circuit, and a resistor spaced apart from said telephone instrument and serially connected in said operative circuit with said telephone instrument.

45. In combination, a telephone line circuit having a remote source of D. C. connected thereto, a telephone instrument connected to said line circuit and having a transmitter operable by current received thereover, a recorder having input terminals connected to said line circuit, manually operable switch means included serially in a circuit with said instrument, the line circuit and a resistor for connecting said telephone instrument to said line and a resistor in series with said telephone instrument to reduce the current flowing from said circuit to said instrument when said recorder is connected thereto.

46. In combination with a telephone line circuit, a repeating coil having windings, a telephone instrument having a hook switch including contacts serially including one of said windings and the telephone line circuit, said telephone instrument having a transmitter and receiver connected in a circuit with other contacts and the other of said windings, a reproducing phonograph having output terminals, means having one set of contacts connected to said output terminals and to one winding of said repeating coil and having an actuating winding connected to said line circuit and operable by incoming current over said telephone circuit for connecting said phonograph to a winding of said repeating coil to deliver a recorded message over said telephone line circuit, and switch means connected to said telephone and phonograph and said line circuit whereby said telephone and phonograph are independently operable to transmit outgoing speech over said line circuit.

47. In combination with a telephone line circuit, a repeating coil having windings, a telephone instrument having a hook switch including contacts serially including one of said windings and the telephone line circuit, said telephone instrument having a transmitter and receiver connected in a circuit with other contacts and the other of said windings, a recording phonograph having input terminals and means having one set of contacts connected to said input terminals and to one winding of said repeating coil and having an actuating winding connected to said line circuit and operable by incoming current over said telephone circuit for connecting said phonograph to a winding of said repeating coil to record speech incoming over said line circuit, and switch means connected to said telephone and phonograph and said line circuit whereby said telephone and phonograph are independently operable to receive speech incoming over said line circuit.

48. In combination with a telephone line circuit, a repeating coil having windings, a telephone instrument having a hook switch including contacts serially connected to one of said windings and to the telephone line circuit, said telephone instrument having a transmitter and receiver connected in a circuit with other contacts and the other of said windings, a reproducing phonograph including an amplifier having output terminals, means having one set of contacts connected to said output terminals and to one winding of said repeating coil and having an actuating winding connected to said line circuit and operable by incoming current over said telephone circuit for connecting said phonograph to a winding of said repeating coil to deliver a recorded message over said telephone line circuit, a recording phonograph including an amplifier having input terminals, and means having one set of contacts connected in series with said output terminals and another set of contacts connected to said line circuit and to said input terminals, means operated by said reproducing phonograph for disconnecting the contacts from the line circuit and connecting said recording phonograph to the line circuit to receive speech incoming thereon.

49. In combination with a telephone line circuit, a telephone instrument having a hook switch and a receiver and transmitter, coupling means connected in a circuit with said instrument and said line circuit for coupling said telephone instrument to said line circuit, switch means having contacts connected to and controlled by said hook switch for physically connecting said coupling means to said circuit, a phonograph, and means including contacts connected in a circuit with said phonograph and said line circuit for connecting said phonograph thereto via said coupling means in response to incoming ringing current, whereby the latter will act as a barrier for direct current between said line circuit and said phonograph.

50. The combination as claimed in claim 49 wherein said means for physically connecting said coupling means to said circuit includes circuit means affording a path for direct current to flow in said line circuit.

51. The combination as claimed in claim 49 including switch means in a circuit with a local source of current and said transmitter, whereby said telephone transmitter is supplied from said local source of current.

52. In combination with a telephone line circuit, a telephone instrument including a receiver and transmitter, circuit means connecting said telephone instrument to said line circuit, and including means to prevent the flow of D. C. from the line circuit to the telephone, a phonograph including an amplifier having terminals, current controlled means in a circuit with said telephone circuit and having contacts and other circuit means connected thereto for connecting said amplifier terminals thereto including a relay responsive to alternating current, a motor for driving said phonograph, and contact means connected in a circuit with said motor and a source of current for control of the operation of said motor by said relay.

53. The combination as claimed in claim 52 including a second phonograph including an amplifier having terminals and means under the control of said first phonograph having cooperative contacts connected to said line circuit and to said last terminals for connecting said second phonograph to said line circuit.

54. In combination with a telephone line circuit, an amplifier having a first input circuit and second input circuit and a first and second output circuits, means having contacts connected to said first input circuit and to said line circuit and means to prevent the flow of direct current connected in the circuit established by the closure of said contacts for connecting said first input circuit to said telephone line circuit including said means to prevent, whereby the latter prevents the flow of direct current from said telephone line to said first input circuit, means having contacts connected to said first output circuit and to said line circuit and having means to prevent the flow of direct current included in a circuit established by the closure of said last contacts for connecting the former to the latter and including said second means to prevent the flow of direct current from said telephone line to said first output circuit, individual translating means connected to each of said second input and output circuits, manually operable means having one set of contact means connected to first input circuit and to said line circuit and having another set of contact means connected to said output circuit and to said line circuit for connecting said first input and output circuits to said telephone line via said first means for preventing flow of direct current thereto, and means operable by incoming current over said telephone line to connect said amplifier to said telephone line via said first means.

55. The combination as claimed in claim 54 including a microphone and an earphone and means having several sets of cooperative contacts, one set being connected in a circuit with said line circuit, said microphone and said earphone; another set being connected to said line circuit and to the input terminals of the amplifier; and another set being connected to said line circuit and to the output terminals of said amplifier for selectively connecting said microphone and earphone to the telephone line circuit and to the input and output circuits of said amplifier.

56. The combination as claimed in claim 54 including means whereby the duration of the operation of said translating means connected to said second output circuit may be predetermined.

57. The combination as claimed in claim 54 including means whereby the duration of the operation of said translating means connected to said second input circuit may be predetermined.

58. In combination, a telephone line circuit, a telephone instrument including a transmitter and a receiver, switch means including cooperative contact means connected to said instrument and to said line circuit for establishing a circuit between said instrument and said line circuit, a recorder having input terminals and means for supporting and moving a record blank, means including one set of contacts included in said established circuit and another set connected to said input terminals and to said instrument for disconnecting said instrument from said circuit and connecting same in a recording circuit with said recorder to record sound on said blank via said transmitter; means for producing a signal tone and for superimposing said signal tone upon said recording circuit and recording same on said record, and means including contacts connected to said line circuit and to said signal tone means for connecting said signal tone means to said telephone line circuit while said telephone instrument is disconnected therefrom by the deaction of said first switch means.

59. In combination, a telephone line circuit, a recorder having input terminals and including means to support and move a record blank relative to translating means thereon, means for producing a signal tone, a source of high frequency adjacent to said recorder having manual switching means interconnected in a circuit therewith, means to establish a recording circuit between said output terminals and said line circuit, means to impress said signal tone upon said recording circuit to record the same upon said blank while the latter is receiving a recording via said line circuit, and means for cyclically controlling said high frequency source and to impress the same on said line circuit at predetermined intervals.

HARRY R. VAN DEVENTER.
PAUL C. BAILEY.

References Cited in the file of this patent

UNITED STATES PATENTS

| Number | Name | Date |
|---|---|---|
| 1,845,034 | Bickelhaupt | Feb. 16, 1932 |
| 1,939,072 | Mallina | Dec. 12, 1933 |
| 1,955,497 | Harvey | Apr. 17, 1934 |
| 1,973,081 | Keiser | Sept. 11, 1934 |
| 2,080,812 | Fairbanks | May 18, 1937 |
| 2,093,675 | Henderson | Sept. 21, 1937 |
| 2,165,546 | Heller | July 11, 1939 |
| 2,221,883 | Rowe | Nov. 19, 1940 |
| 2,250,242 | Thompson | July 22, 1941 |
| 2,261,420 | Shively et al. | Nov. 4, 1941 |
| 2,278,828 | Chiardio | Apr. 7, 1942 |
| 2,283,591 | Van Deventer | May 19, 1942 |
| 2,284,173 | Soukup et al. | May 26, 1942 |
| 2,300,950 | Lux | Nov. 3, 1942 |
| 2,313,852 | Van Deventer | Mar. 16, 1943 |
| 2,321,053 | Van Deventer | June 8, 1943 |
| 2,322,359 | Van Deventer | Oct. 19, 1943 |
| 2,340,160 | Van Deventer | Jan. 25, 1944 |
| 2,374,842 | Shively et al. | May 1, 1945 |
| 2,376,272 | Peterson et al. | May 15, 1945 |
| 2,380,799 | Shively et al. | July 31, 1945 |
| 2,393,272 | Van Deventer | Jan. 22, 1946 |
| 2,396,385 | Plym | Mar. 12, 1946 |
| 2,417,129 | Rusch | Mar. 11, 1947 |
| 2,528,459 | Thompson et al. | Oct. 31, 1950 |
| 2,531,203 | Galbreath | Nov. 21, 1950 |
| 2,558,040 | Carter | June 26, 1951 |